(12) United States Patent
Watson

(10) Patent No.: US 8,676,440 B2
(45) Date of Patent: Mar. 18, 2014

(54) SEMI-ACTIVE SNOWMOBILE REAR SUSPENSION

(75) Inventor: Bradley E. Watson, Barrie (CA)

(73) Assignee: Magna International Inc., Aurora (CA)

( * ) Notice: Subject to any disclaimer, the term of this patent is extended or adjusted under 35 U.S.C. 154(b) by 153 days.

(21) Appl. No.: 13/333,110

(22) Filed: Dec. 21, 2011

(65) Prior Publication Data

US 2012/0166043 A1   Jun. 28, 2012

Related U.S. Application Data

(60) Provisional application No. 61/459,984, filed on Dec. 22, 2010.

(51) Int. Cl.
*G06F 7/00* (2006.01)

(52) U.S. Cl.
USPC ................................. 701/36; 701/37

(58) Field of Classification Search
USPC .................................................... 701/36–37
See application file for complete search history.

(56) References Cited

U.S. PATENT DOCUMENTS

| | | | |
|---|---|---|---|
| 5,667,031 A | 9/1997 | Karpik | |
| 6,032,752 A | 3/2000 | Karpik et al. | |
| 6,964,448 B2 * | 11/2005 | Morin | 296/136.07 |
| 7,694,768 B2 | 4/2010 | Giese et al. | |
| 2002/0088652 A1 * | 7/2002 | Zaczkowski et al. | 180/9.54 |
| 2003/0019676 A1 * | 1/2003 | Mallette et al. | 180/190 |
| 2004/0251708 A1 * | 12/2004 | Morin | 296/136.07 |
| 2006/0169510 A1 * | 8/2006 | Visscher | 180/193 |
| 2009/0043465 A1 * | 2/2009 | Tomita | 701/51 |
| 2009/0050389 A1 * | 2/2009 | Watling | 180/190 |
| 2010/0071982 A1 * | 3/2010 | Giese et al. | 180/193 |
| 2010/0121515 A1 * | 5/2010 | Izumi | 701/22 |
| 2012/0193158 A1 * | 8/2012 | Giese | 180/193 |

* cited by examiner

*Primary Examiner* — Hussein A. Elchanti
(74) *Attorney, Agent, or Firm* — Warn Partners, P.C.

(57) ABSTRACT

A snowmobile suspension system connected between a skid frame positioned below a chassis of a snowmobile. A limiter strap adjustment mechanism is connected between the chassis and the at least one limiter strap and selectively adjusts the length of the at least one limiter strap. A coupling arm adjustment mechanism is connected between the chassis and at least one coupling arm and selectively adjusts the length of the at least one coupling arm. A linear force device adjustment mechanism is connected between the chassis and the linear force device for adjusting the length and angle of the linear force device relative to the at least one rear arm resulting in control of the force displacement characteristics of the at least one rear arm.

55 Claims, 26 Drawing Sheets

SEMI-ACTIVE SNOWMOBILE REAR SUSPENSION

CROSS-REFERENCE TO RELATED APPLICATIONS

This application claims the benefit of U.S. Provisional Application No. 61/459,984, filed Dec. 22, 2010.

FIELD OF THE INVENTION

The present invention relates to a suspension system for a snowmobile which has a reduced amount of unsprung mass, improving the overall performance of the snowmobile and an electronically and manually adjustable suspension.

BACKGROUND OF THE INVENTION

Typical suspension designs for snowmobiles have relatively high unsprung weight values for the components due to the fact that most, if not all, components are arranged within the confines of the track perimeter and move when the suspension deflects vertically. In current snowmobile designs, as much as seventy percent of the weight of the snowmobile is unsprung weight. In addition, prior art systems have what is referred to as falling rate or constant rate spring force/vertical travel characteristics. This produces unfavorable rider comfort levels when attempting to tune a suspension system with a single combination of spring and damping rates to be comfortable when traveling over low or smaller bumps, while being able to absorb high or deep level terrain.

There are three typical rear suspension adjustments in most snowmobiles today which consist of spring rates, a coupling between front and rear arms, and a front skid rail limiter strap to control weight transfer. All three of these adjustments are accomplished by means of mechanical adjustments made with various tools, and the actual locations for each are within the general confines of the track in areas that are prone to snow and ice accumulation and freezing of the various components required to make the adjustments. Due to the difficulty involved in making adjustments, and the operator's ability to quantify or realize the improvement (or lack thereof) because the snowmobile must be stopped in order to perform the tasks, this often results in the situation where the rider is either too inconvenienced to make changes, or doesn't readily feel the differences when adjustments are made.

U.S. Pat. No. 6,032,752 is an invention for a semi-active rider controlled rear shock angle device. There are also several types of rider-controlled shock valve damping devices in snowmobiles. The first mentioned device does not offer any improvement to reducing unsprung mass and is very prone to failure due to freezing of mechanical components. Tuning of shock valving has limited affect on overall suspension characteristics. None of the existing designs provide a driver controlled method for changing the front skid frame limiter strap adjustment or an adjustment for rider controlled coupling changes between the front and rear arms of the rear suspension system. A change in the coupling of the arms has a significant impact on weight transfer, cornering ability, and rider comfort. All three of the typical adjustments of a rear suspension system must work together to realize the most gain from each individual adjustment. Existing designs only offer limited ability to change the overall adjustment capability and overall performance resulting from these changes.

Thus, there is a general lack of comfort in riding due to lack of ideal suspension tuning for changes in rider(s) weight, and most of all, varying trail and terrain conditions such as types of bumps, riding speeds, and types of corners encountered in everyday riding conditions.

SUMMARY OF THE INVENTION

The present invention is directed to a snowmobile suspension system connected between a skid frame positioned below a chassis of a snowmobile. At least one limiter strap, at least one coupling arm, at least one front arm, and at least one rear arm are connected between the chassis and the skid frame. A linear force device is connected to the at least one rear arm.

A limiter strap adjustment mechanism is connected between the chassis and the at least one limiter strap and selectively adjusts the length of the at least one limiter strap. A coupling arm adjustment mechanism is connected between the chassis and at least one coupling arm and selectively adjusts the length of the at least one coupling arm. A linear force device adjustment mechanism is connected between the chassis and the linear force device for adjusting the length and angle of the linear force device relative to the at least one rear arm resulting in control of the force displacement characteristics of the at least one rear arm.

The present invention is also directed to providing an electronic control module and interactive driver display. The electronic control module is configured to electronically control the selective adjustment of one or more of the limiter strap adjustment mechanism, the coupling arm adjustment mechanism and the linear force adjustment mechanism. The interactive display allows the driver to view information concerning the current selective adjustment and input commands for further adjustment settings into the interactive display unit, which are then transmitted to the electronic control module so a new selective adjustment can be made.

The present invention is further directed to a snowmobile suspension system having an unsprung weight amount equal to about forty percent of the overall weight of the snowmobile suspension assembly.

The present invention is further directed to a suspension system for a snowmobile which has a reduced amount of unsprung weight. The snowmobile having a suspension system according to the present invention has about forty percent of the weight of the snowmobile suspension assembly is unsprung weight. A first embodiment of the present invention is a manual suspension adjustment method with improved access outside of the track, and could be made in motion or while stopped, with no requirement of any tools. A second embodiment of the present invention is a suspension system having electrically controlled suspension adjustments with rider controlled capability while in motion, with digital display of degree or increment of adjustment feature.

Accordingly, it is an object of the present invention to reduce unsprung mass of components in their dynamic state to reduce energy feedback to the chassis and rider, and to create a design for a semi-active rider controlled suspension system with either simple manually controlled adjustments without the use of any tools, or electronically controlled adjustments that can be made either while riding to better sense and feel the improvements, or in a real time scenario. Therefore, the rider not only "feels" the changes quickly, but also avoids the problems with tools and ice or snow build up in the components on an ongoing basis as conditions are constantly changing. The results are improved rider comfort, performance, and handling as a result of a semi-active suspension system.

To address the issue of reducing unsprung mass, many components are positioned in an area outside of the track and have been situated to still perform the required function while being located on the chassis side of the system to become sprung mass. In addition, the devices required to make adjustments to the three typical features in a rear suspension have been relocated outside of the track to areas where snow and ice build-up do not affect their ease of adjustment.

The present invention discloses several methods and combinations thereof to change spring force/displacement elements, coupling, and limiter strap length, in a manner whereby they are either manually adjusted or electrically adjusted while the snowmobile is in motion or stopped. In the case of the electronically controlled adjustments, the invention utilizes an electronic display to show the position, or rate of change, for each adjustment. The manual control knobs have a dial or hole position to identify the knob's respective position.

To address the problem of falling rate suspension force/ displacement design, the present invention uses a combination of bell crank and links to improve the motion ratio between the actual shock (or linear force device) and the vertical displacement of the suspension assembly with respect to the chassis. With the use of linkages and the angle at which the variable linear force device is mounted, a rising rate force/displacement characteristic is obtained. This is achieved with either linear rate steel coil springs or the use of a compressed air force device with an onboard air compressor to change the spring rate of the air spring itself. Any combination of air springs, or coil springs when attached and used with the linkage system produces a variable rising rate suspension.

Typical suspensions today have motions ratios that are not constant thereby creating falling rate force displacement curves. Another object of the present invention is to create a constant motion ratio relative to vertical suspension travel. Once this objective is achieved, one then applies different force "k" factors to the motion ratio design in order to add more rising rate characteristics to the force displacement curves. This is achieved with progressive wound steel coil springs, a combination of two or more different coil springs added end to an end of the shock absorber, or an air spring which typically has a very non-linear spring rate characteristic. Any of these above mentioned spring elements are arranged in the present invention such that they are sprung mass. Therefore, the mass of components that must move with the suspension in a generally vertical direction is reduced compared to existing suspension designs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In some of the drawings contained herein some components of a snowmobile such as the track, front drive axle assembly have not been included in the figures for the sake of clarity as they are common and typical to most snowmobile rear suspension systems.

Figure 1:
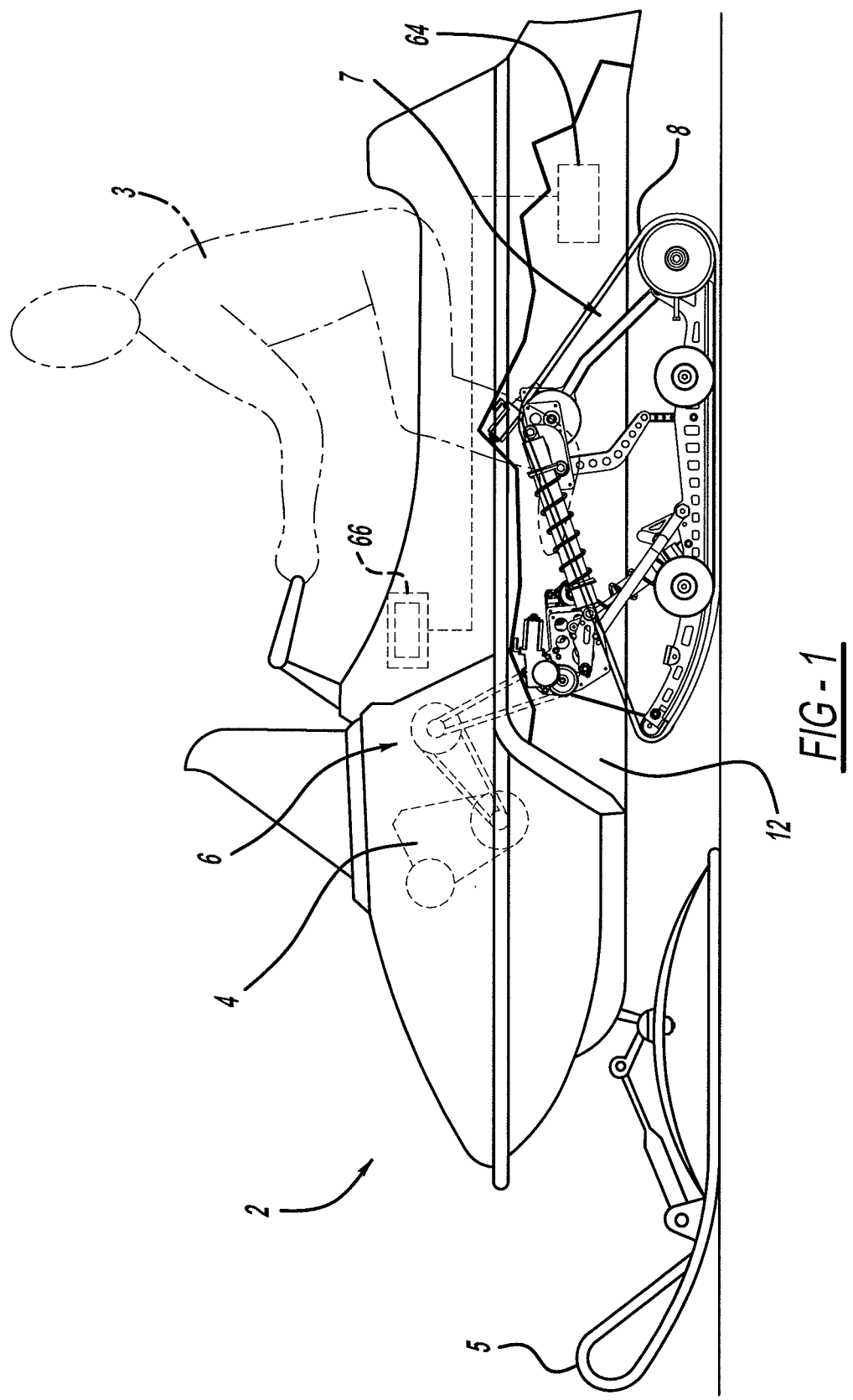
FIG. 1 is a side environmental view of a snowmobile having a suspension in accordance with one embodiment of the present invention.
Figure 2:
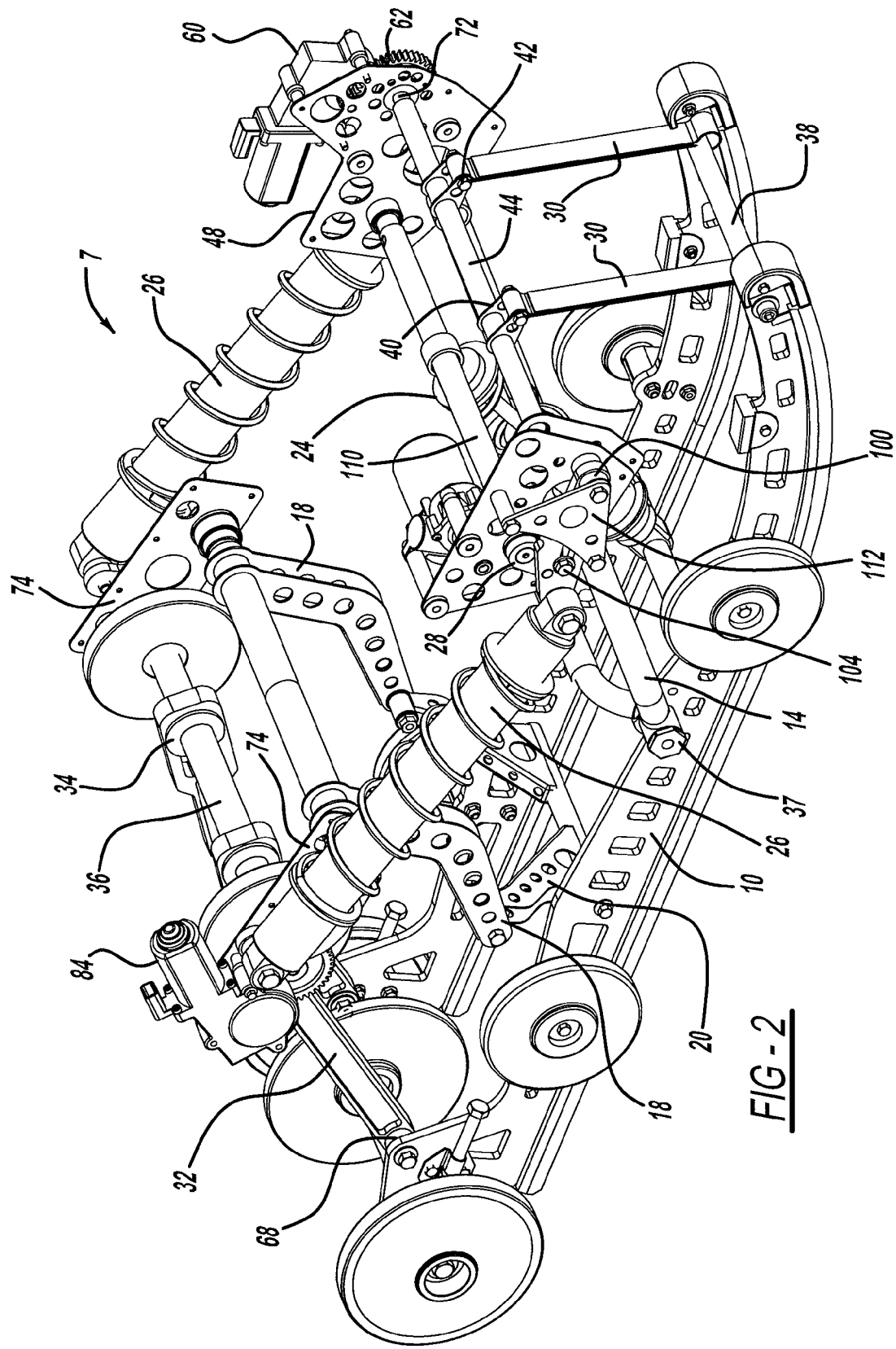
FIG. 2 is an isometric view of suspension type with electrically controlled shock angle, electrically controlled coupling and electrically controlled limiter strap.
Figure 3:
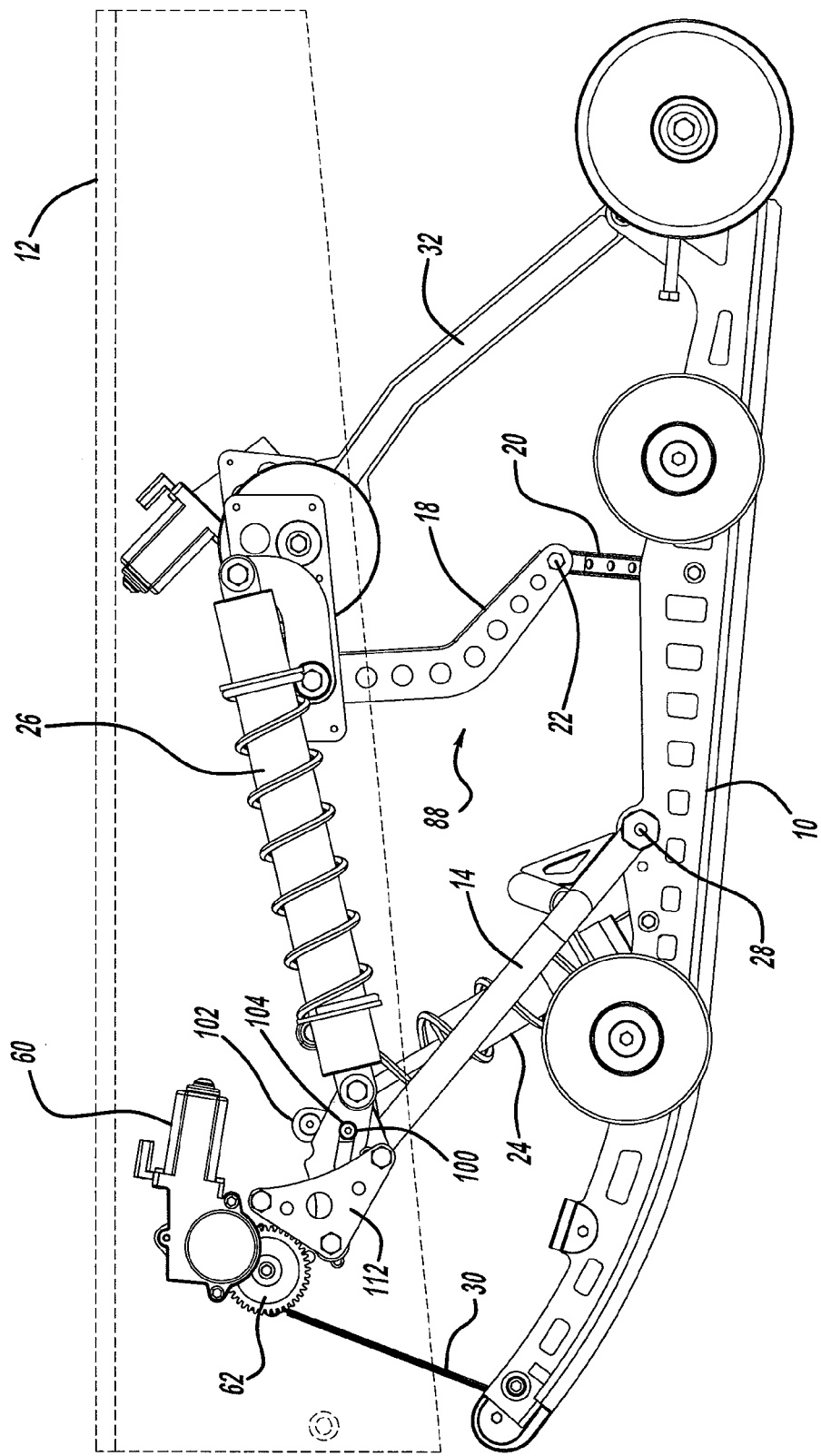
FIG. 3 is a left side view of electrically controlled shock angle, limiter and coupling with partial chassis.
Figure 4:
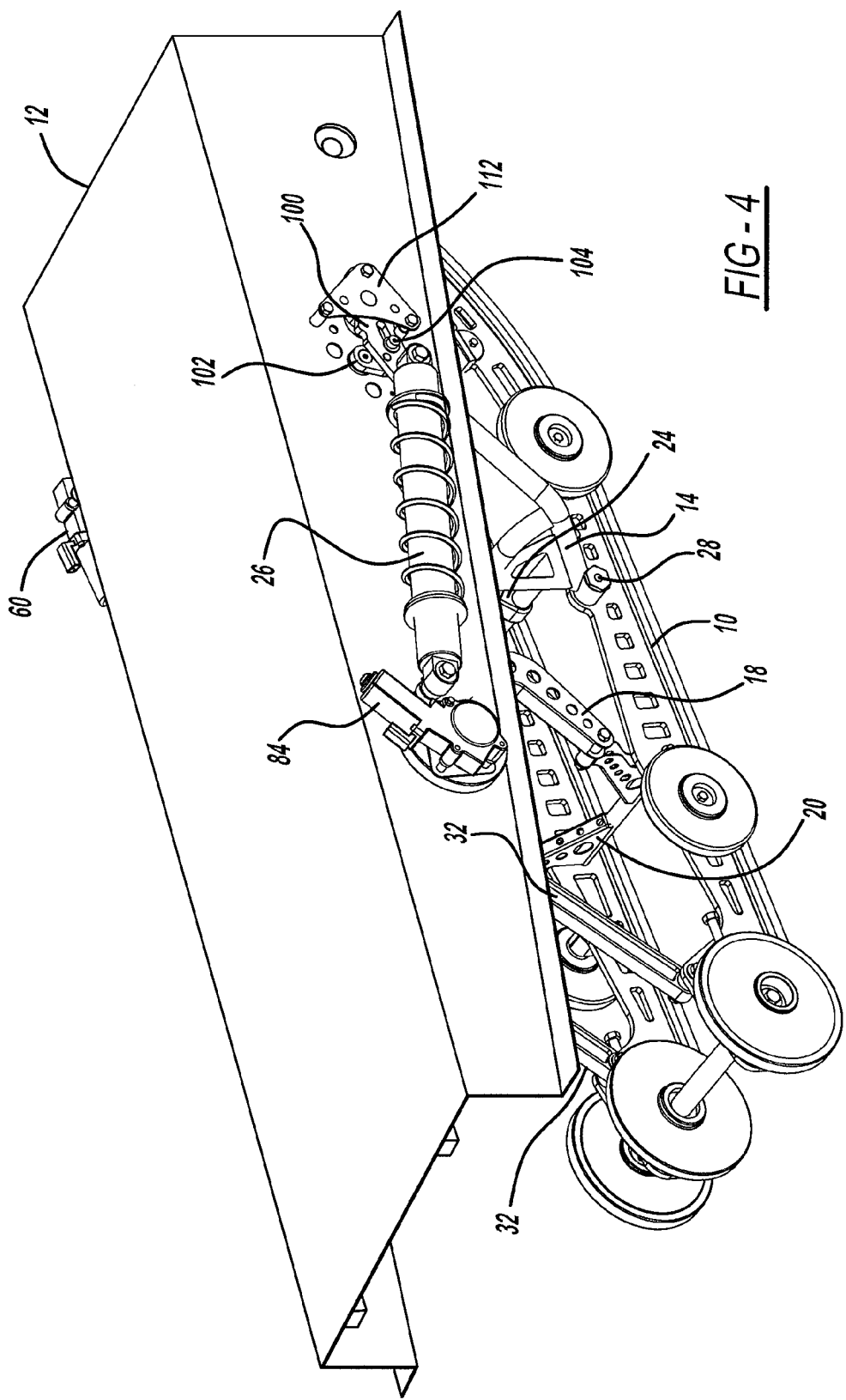
FIG. 4 is a left rear isometric view of above electrically controlled shock angle, limiter and coupling with partial chassis.
Figure 5:
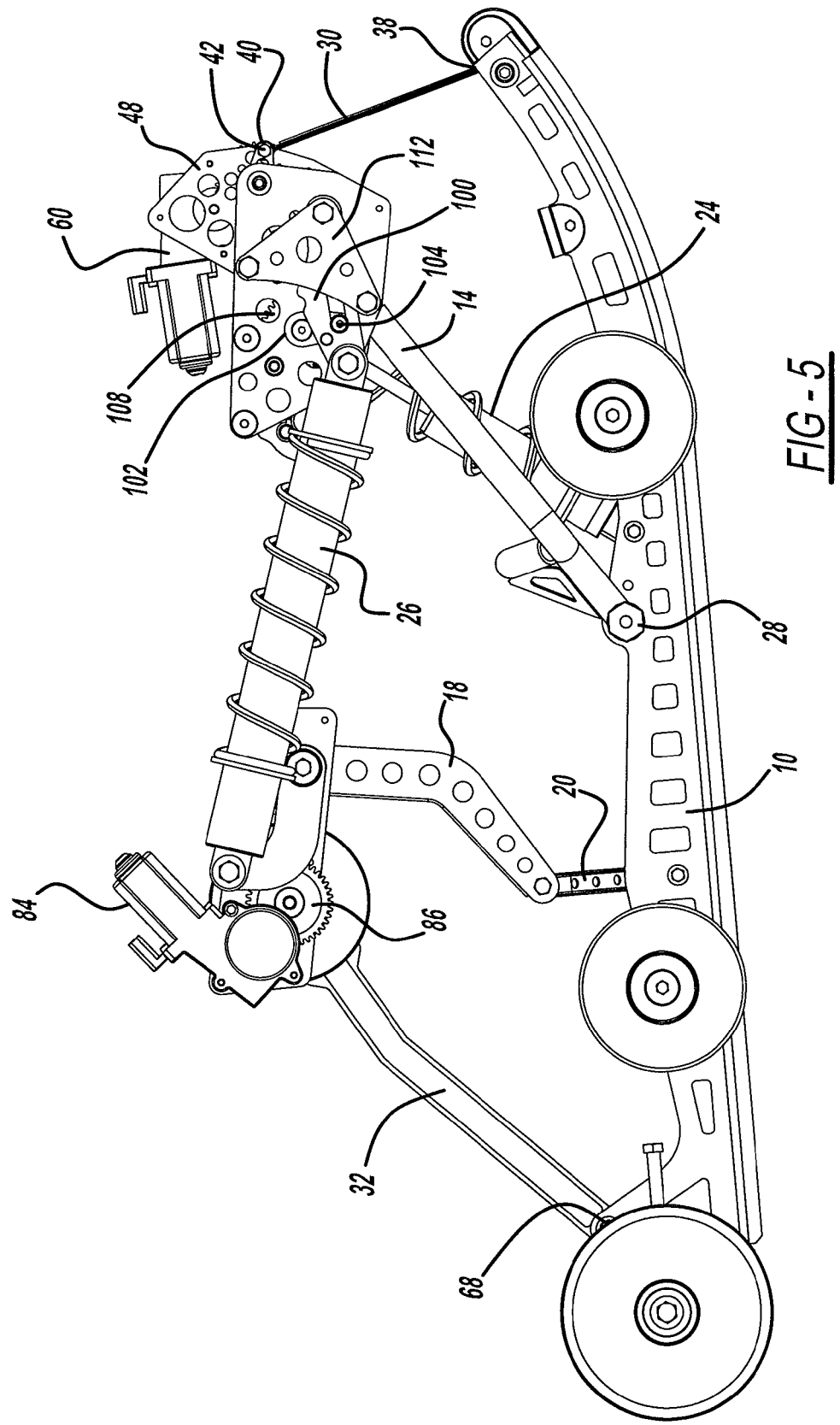
FIG. 5 is a right side view of suspension module electrically controlled shock angle, limiter and coupling.

Referring now to FIG. 1 a side environmental view of a snowmobile having a suspension is shown in accordance with one embodiment of the present invention. A snowmobile 2 is generally depicted with a driver 3 seated thereon. The snowmobile has a skis 5 and a track 8 that contact the ground. The skis 5 are used for steering the snowmobile 2, while the track 8 is generally used to drive the snowmobile 2. The snowmobile 2 has an engine that supplies power to the track 8 through a drive mechanism 6. The drive mechanism 6 can be any suitable linkage including belts and gears. The track 8 is connected to a snowmobile suspension 7.

Referring generally to all the FIGS. with specific reference to FIGS. 2-21 various embodiments depicting the snowmobile suspension 7 according to the present invention are shown and described herein. A chassis 12 of the snowmobile 2 is used for mounting the various components of the snowmobile suspension 7 thereon. Throughout the description the various components of the suspension will be described as "at least one" or discussed in a singular manner, however, the drawings in some views show isometric and perspective views of the suspension 7 and clearly many of the individual components are shown in pairs, one for the left side and one for the right side of the suspension 7. While many designs will have pairs of components it is within the scope of this invention for the paired components of the suspension to be exist in greater or lesser numbers depending on the needs of a particular application. It is within the scope of this invention for some suspensions to be single and not paired, while other designs can require more than a pair of components.

The snowmobile suspension 7 includes at least one front arm 14, a skid frame assembly 10 shown as having two skids but capable of having a greater or lesser number of skids, and at least one rear arm 16 of a two piece lost motion type made up of an upper arm 18 and lower link 20 connected together at a pivot connection 22. The skid frame assembly 10 as shown has is supported by a front spring member 24 and a rear spring member also referred to generally herein as a linear force device or LFD 26, 26'. The LFD 26, 26' can be springs, shocks, generally springs with struts, air springs, gears, friction slots, cushion material or any other suitable device or material that permits active adjustment of the snowmobile suspension, however, it is referred to herein as an LFD since it is within the scope of the invention for devices other than a spring to be used.

As the skid frame assembly 10 travels vertically, the assembly 10 pivots at lower front arm pivot point 28 due to the rear arm 16 having a pivot connection 22 at the lower end of bell crank assembly or upper arm 18 where it attaches to the upper end of lower link 20. In other words, it's not a fixed parallelogram arrangement. The maximum degree of angle variation between the generally horizontal surface of chassis 12 and skid frame assembly 10 is controlled by the length of front limiter straps 30 and also the coupling arms 32.

As the suspension travels vertically, the coupling arms 32 are able to touch a hard stop device which is referred to as coupling cams 34 which are secured and adjustable by way of a coupling shaft 36 connected to chassis 12. The coupling cams 34 have a four-sided shape 38 (shown in FIG. 9) in order to vary the distance between the coupling shaft 36 and the surface of cams 23. This in turn varies the pivotal length of coupling arms 32. The shorter this length becomes due to cam position, the less downward angle of the front of the skid frame assembly 10 is allowable, and a longer pivotal length of the coupling arms 18 allows the skid frame assembly 10 to have an upward slope at the front. This slope or angle variation impacts the amount of weight distribution to the skis 5 of the snowmobile thereby affecting steering behavior and traction. This is generally referred to as "coupling" in the snowmobile industry.

An additional feature commonly known as the limiter straps 30 also controls the amount of angle variation under hard acceleration as the chassis 12 of the snowmobile wants to shift rearward and pivot about the front arm 14. By changing the length of the straps 30, one is able to control this dynamic condition.

The present invention provides what is generally referred to as limiter strap adjustment mechanism 37, which includes two methods for simple adjustment to the length of the limiter straps 30, one being a manual adjustment and the second being a motor controlled system. The straps 30 are attached to a cross member 38 at the skid frame assembly 10 and to plates 40 by way of bolts 42 which are secured to a rotatable shaft 44 mounted on bearings 46 at chassis mounts 47 Referring now to FIGS. 7 and 10, an embodiment showing manual adjustment of the straps 30 is shown. A manual strap adjustment knob 50 is rotatably locked to shaft 44 by a hex drive attachment and free to slide axially to engage holes 52 in knob 50 with a locking pin 54 and is biased in a locked position by spring 56 and retainer 58. This provides for 180-degrees rotation and adjustment of the assembly.

Figure 6:
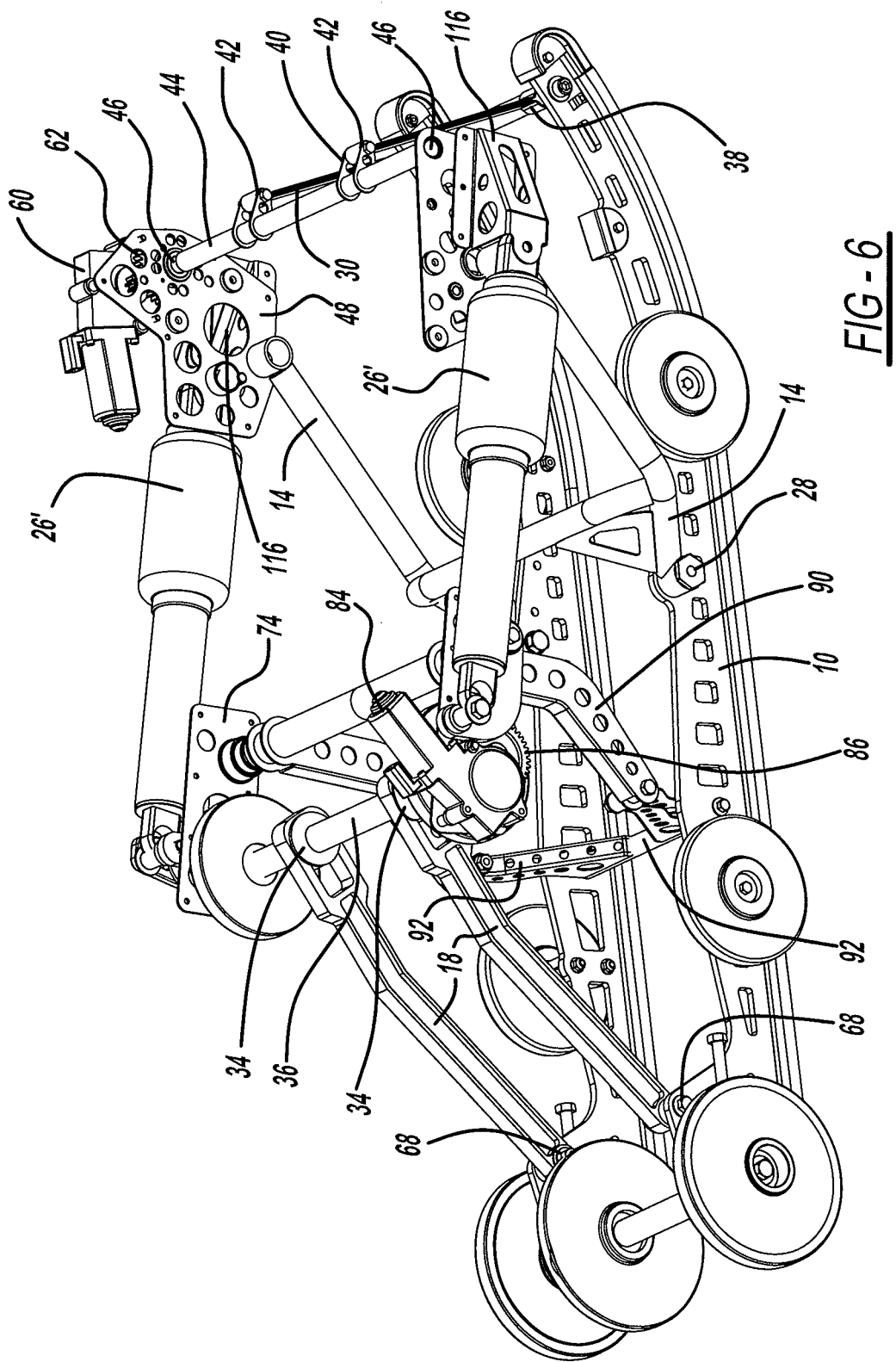
FIG. 6 is a left rear isometric view of suspension module with electrically controlled air type shocks, limiter and coupling.
Figure 7:
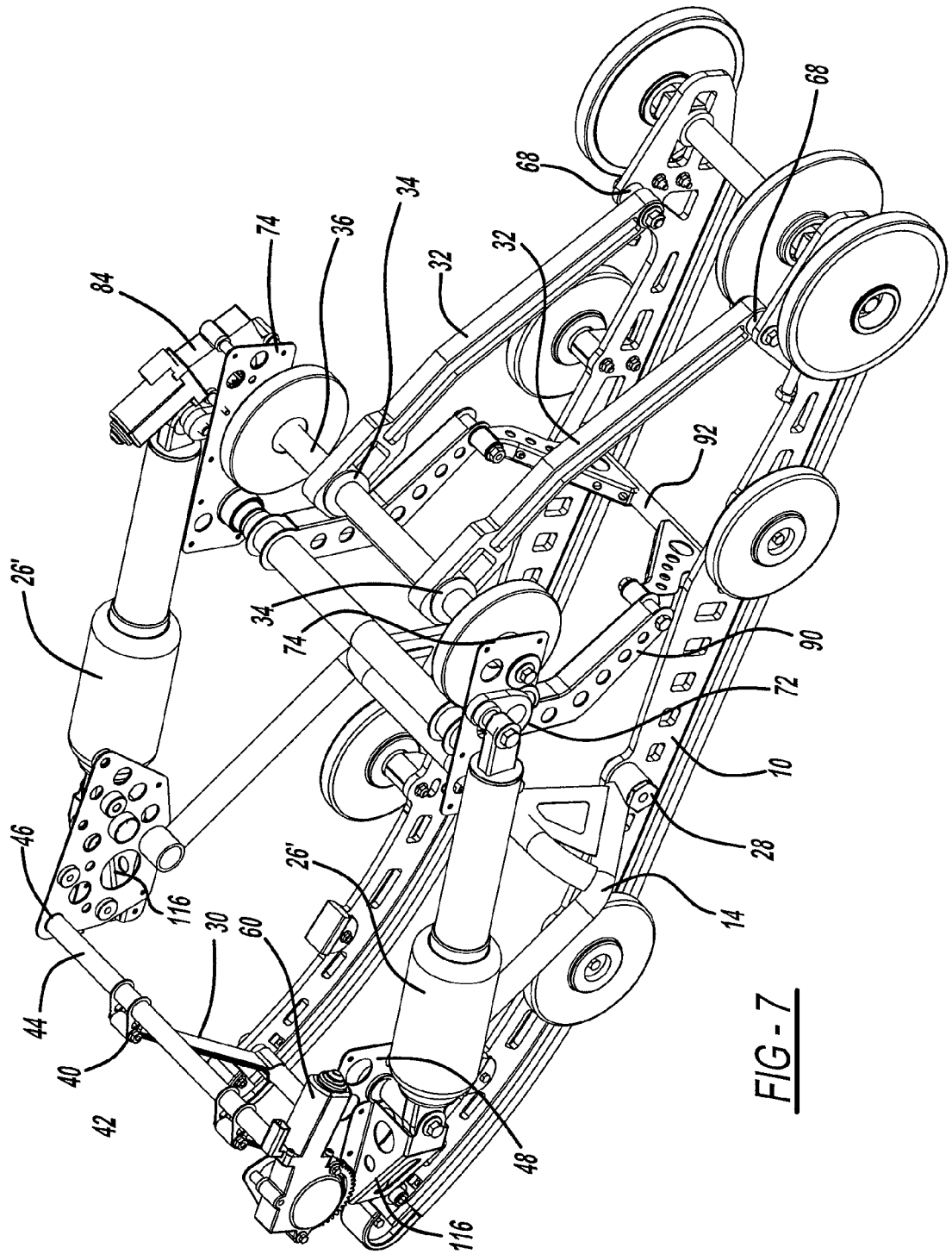
FIG. 7 is a left rear isometric view of suspension module with electrically controlled air type shocks, limiter and coupling.
Figure 8:
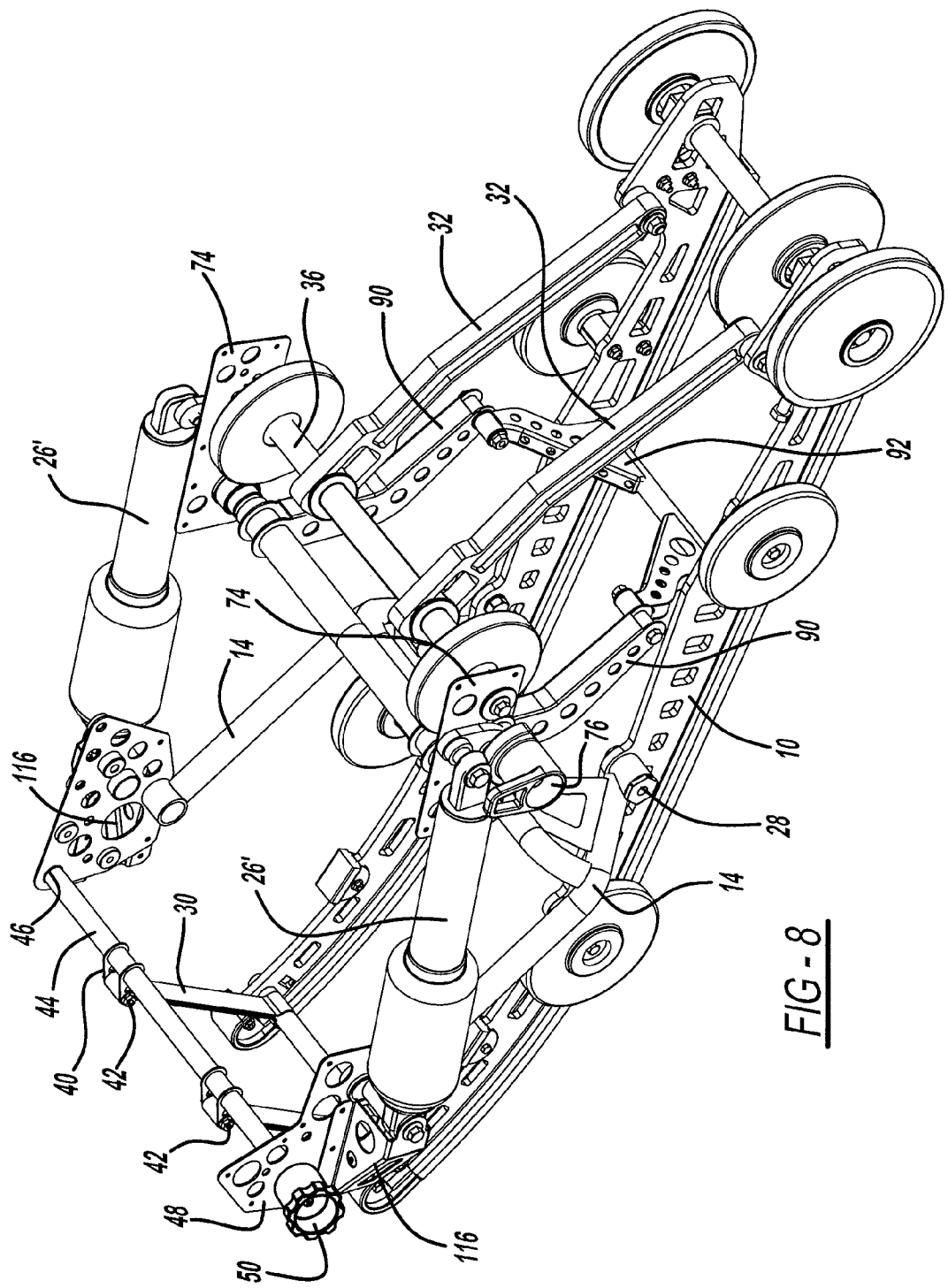
FIG. 8 is a left rear isometric view of suspension module with electrically controlled air type shocks, manually controlled limiter and manually controlled coupling.
Figure 24:
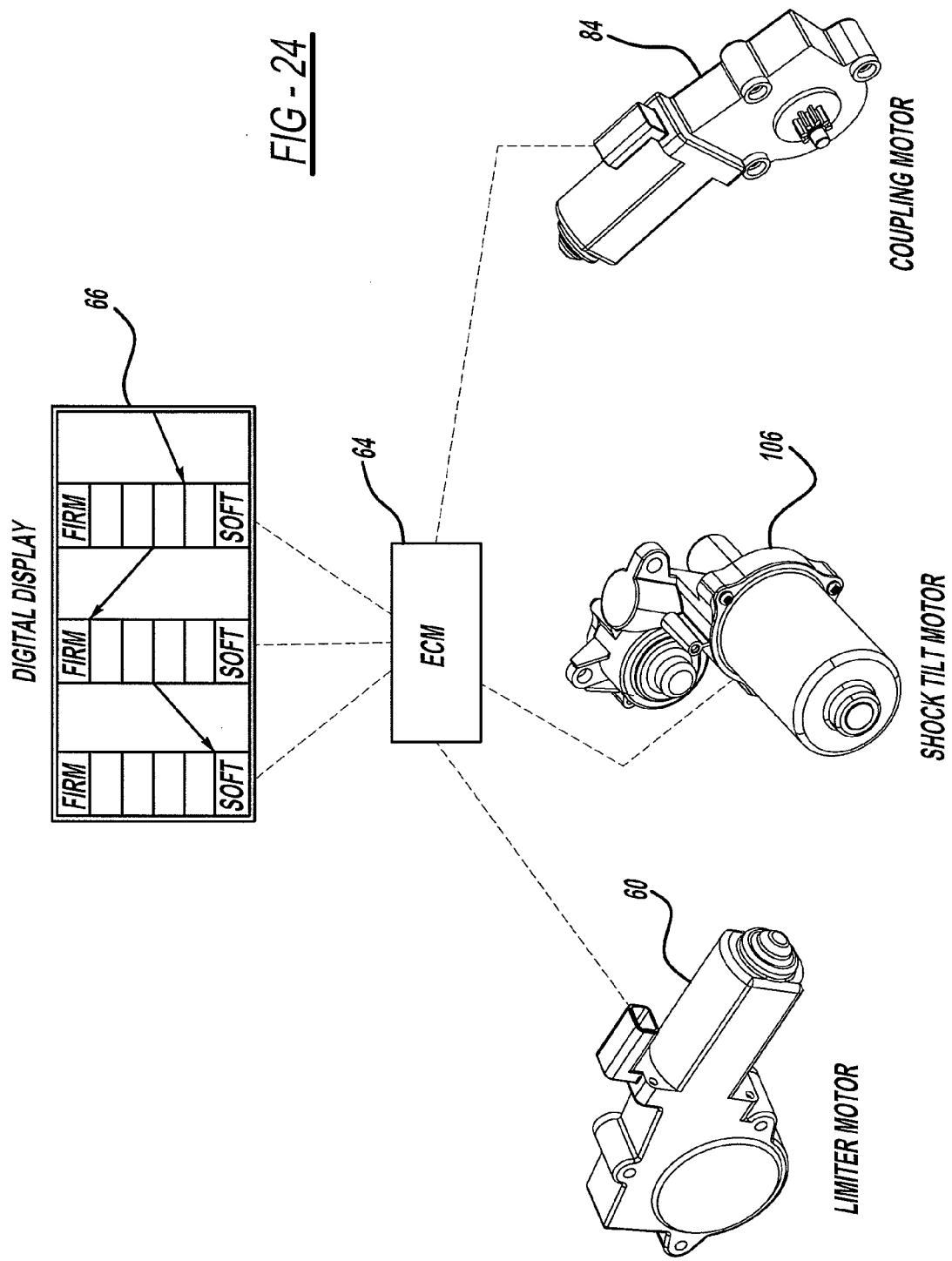
FIG. 24 is an schematic view of an electrical control system in accordance with one aspect of the invention.

Referring now to FIGS. 6, 7 and 24, an embodiment showing electronic adjustment of the straps 30 is shown. A limiter motor 60, which is self-locking, is engaged with driven gear 62 secured to shaft 44. Motor position is controlled by way of hall affect sensors inside motor that send pulse signals to an electronic control module or ECM 64, which in turn provides digital information to a display unit 66 for the rider to indentify the amount or change to the limiter strap length.

Referring now to FIGS. 6, 7, 10, 17-19 and 24, several embodiments showing what is generally referred to as a coupling arm adjustment mechanism 67, which includes both manual and/or electronic adjustment of the coupling arms 32 is shown. The coupling arms 32 are adjusted in a manner similar to the limiter straps described above. The coupling arms 32 are attached to the skid frame assembly 10 by way of bearings 68. The upper end of couplings 32 have an enclosed eye portion 70 of predetermined size and shape which captures the coupling cams 34 rotatably secured to coupling shaft 36 mounted on bearings 72 which are attached to chassis 12 by way of mounts 74, 74'.

Figure 9:
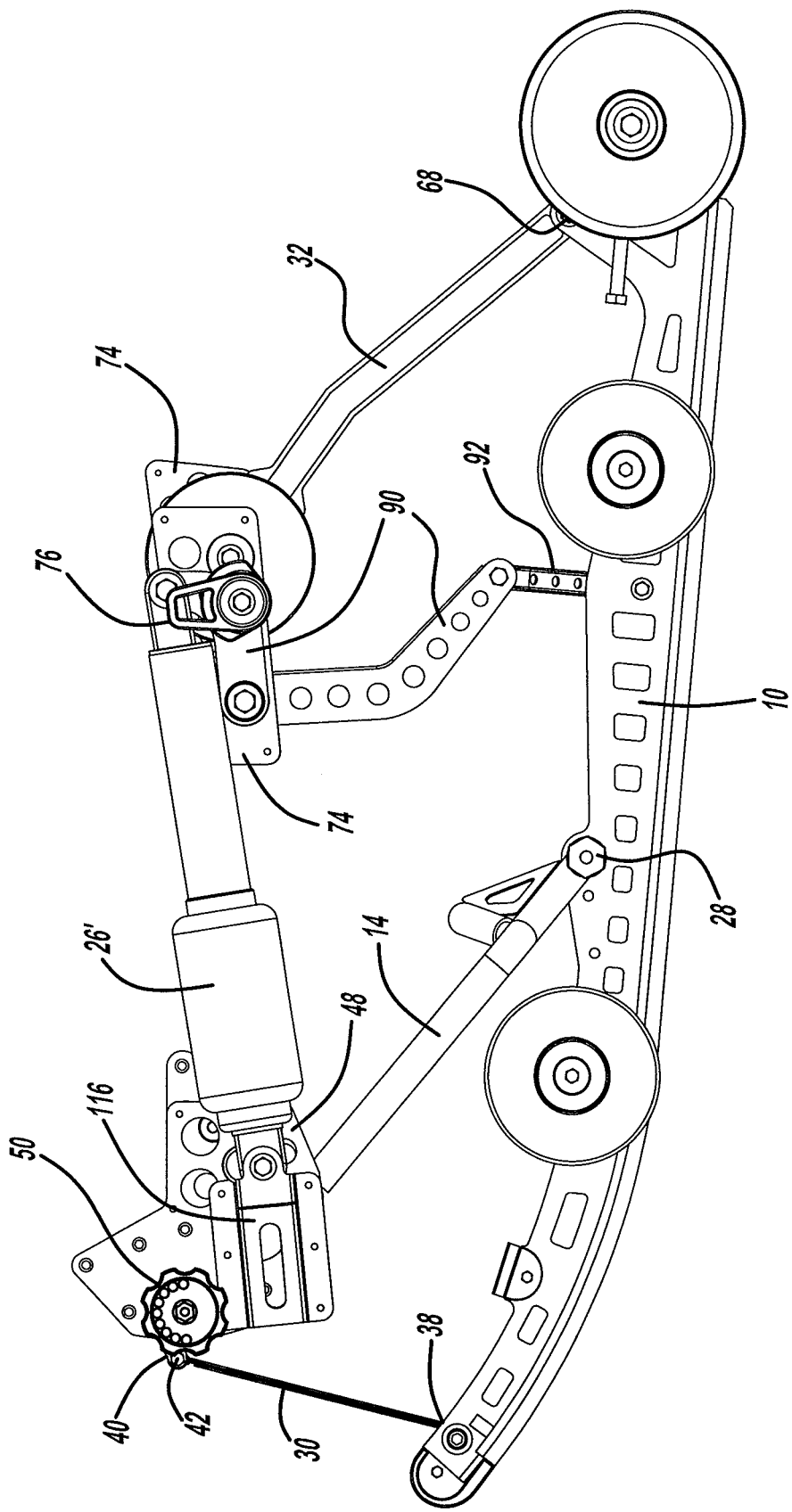
FIG. 9 is a left side view of suspension module with electrically controlled air type shocks, manually controlled limiter and manually controlled coupling.
Figure 10:
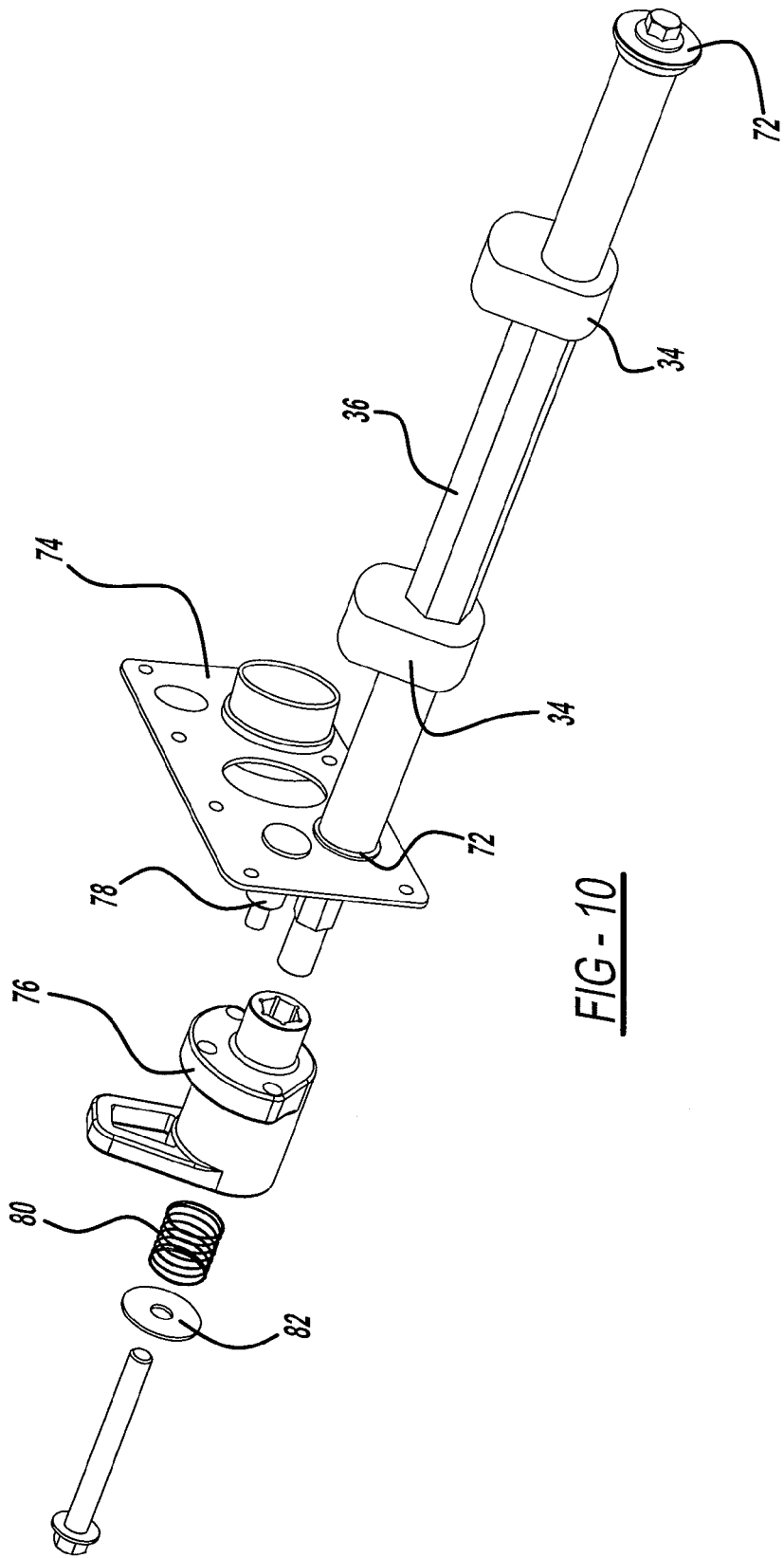
FIG. 10 is an exploded partial view of manually controlled coupling components.
Figure 11:
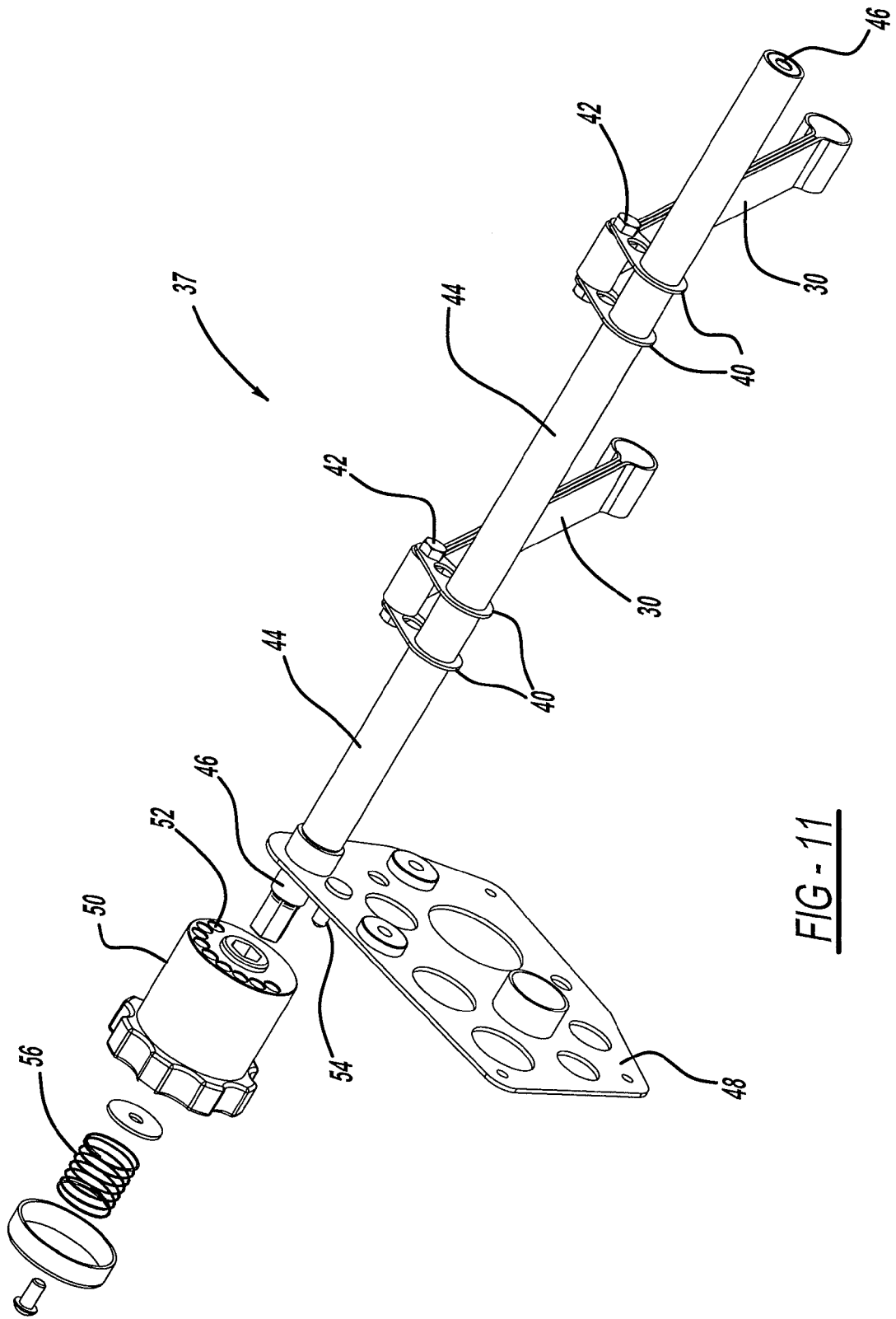
FIG. 11 is an exploded partial view of manually controlled limiter components.
Figure 12:
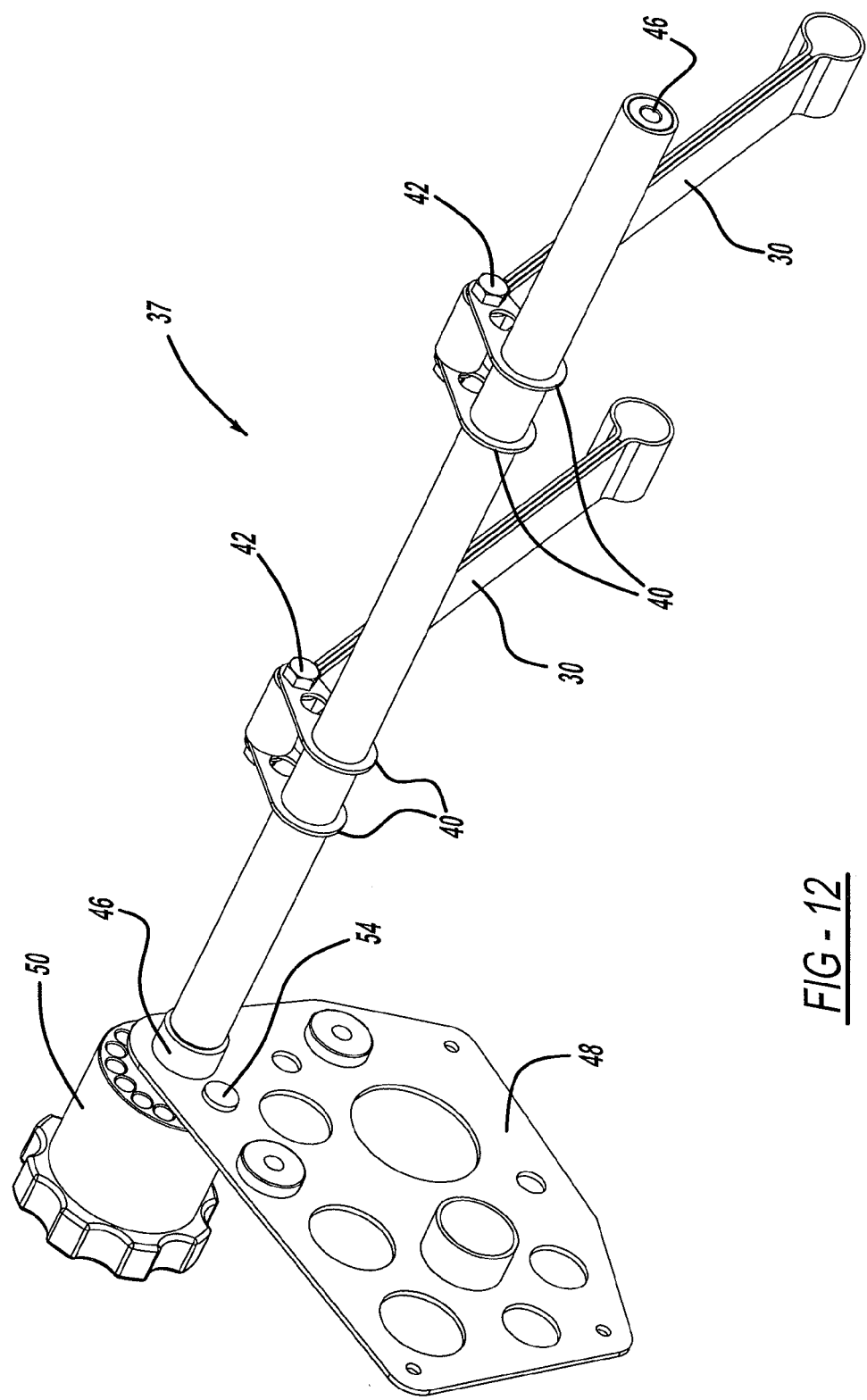
FIG. 12 is a partial view of manually controlled limiter strap components.
Figure 13:
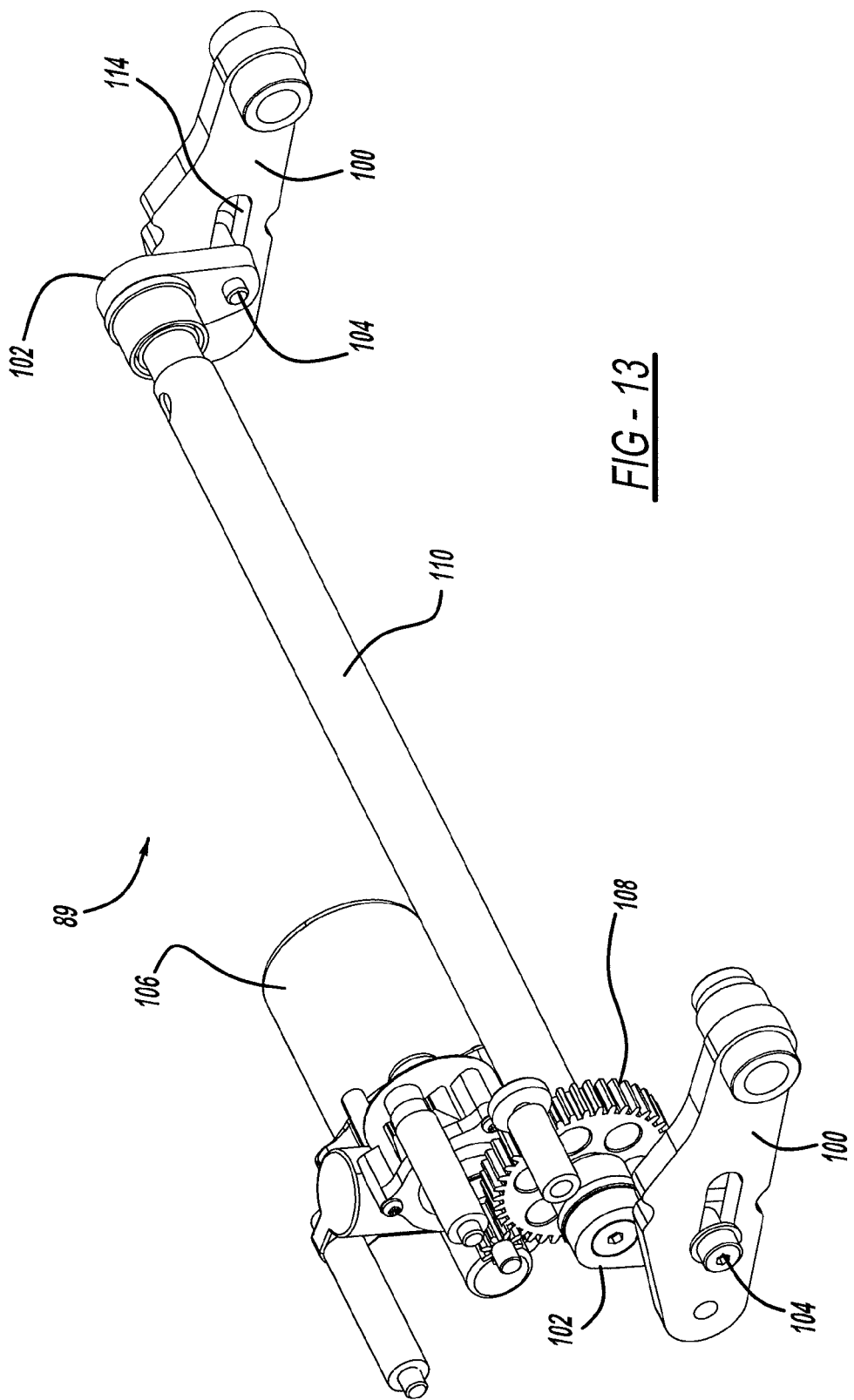
FIG. 13 is a partial view of electrically controlled shock angle adjust mechanism.
Figure 14:
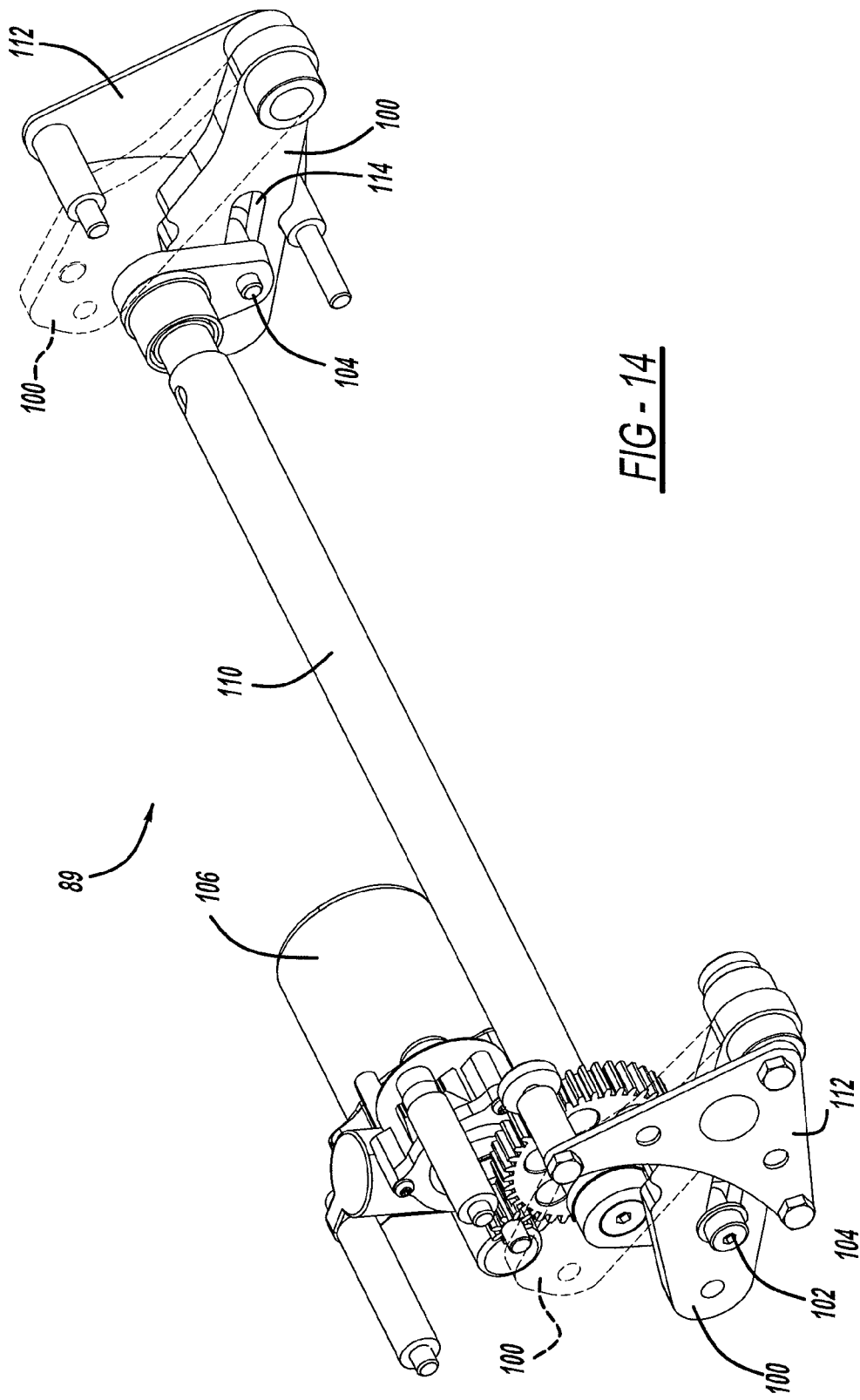
FIG. 14 is a partial view of electrically controlled shock angle adjust mechanism with shock mount plate in firm and soft positions.

In the manually adjustable version shown in FIG. 9, a knob 76 with hex drive attachment to coupling shaft 36 is free to slide axially to engage locking pin 78 secured to the mount 74, 74' in chassis 12. The knob 76 is biased in a locked position by spring 80 and retainer 82. Thus a rotation of coupling shaft 36 is made and locked into position.

In an electronically controlled version of the present invention, a self locking motor 84 with coupling gear drive connected to a gear 86 secured to coupling shaft 36 is able to rotate coupling shaft 36 and coupling cams 34 to accomplish an affective change in pivot length of coupling arms 32.

The next feature of the present invention, shown in detail in FIGS. 13-16, is generally referred to as a linear force device adjustment mechanism 89 and pertains to a method of changing the force displacement relationship of a rear arm spring support system 88. Most snowmobiles use torsion springs arranged within the track area or coil over shock arrangements mounted inside the track configuration. Both types produce either a falling rate or constant rate design. Since neither can be properly tuned to be the most effective in shallow and deep bump situations, it is desirable to have a rising rate design to prevent harsh bottoming in deep bumps and provide comfortable compliance in low bumps.

Figure 25:
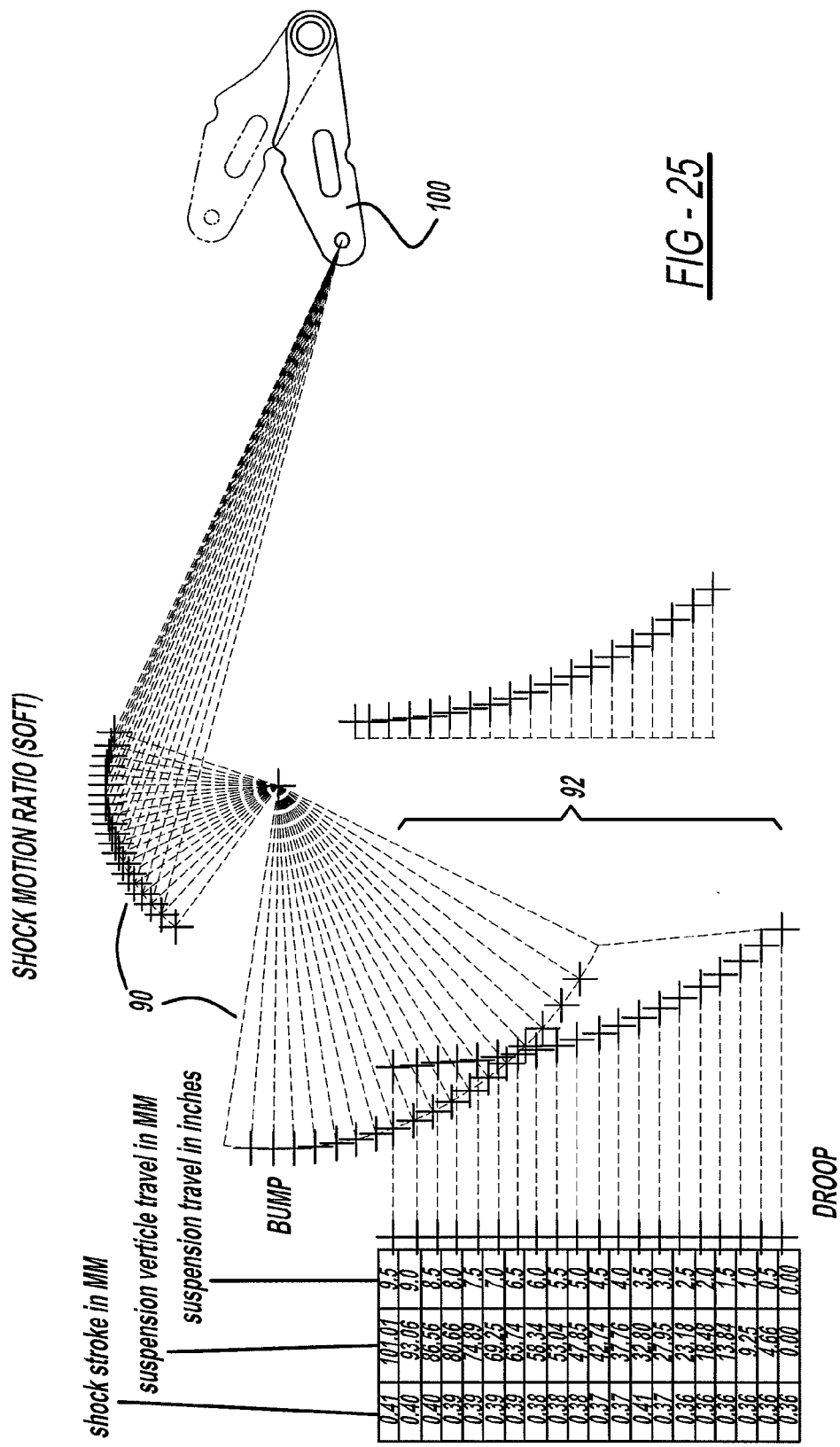
FIG. 25 is a schematic view of the LFD Motion Ratio Layout (soft position)
Figure 26:
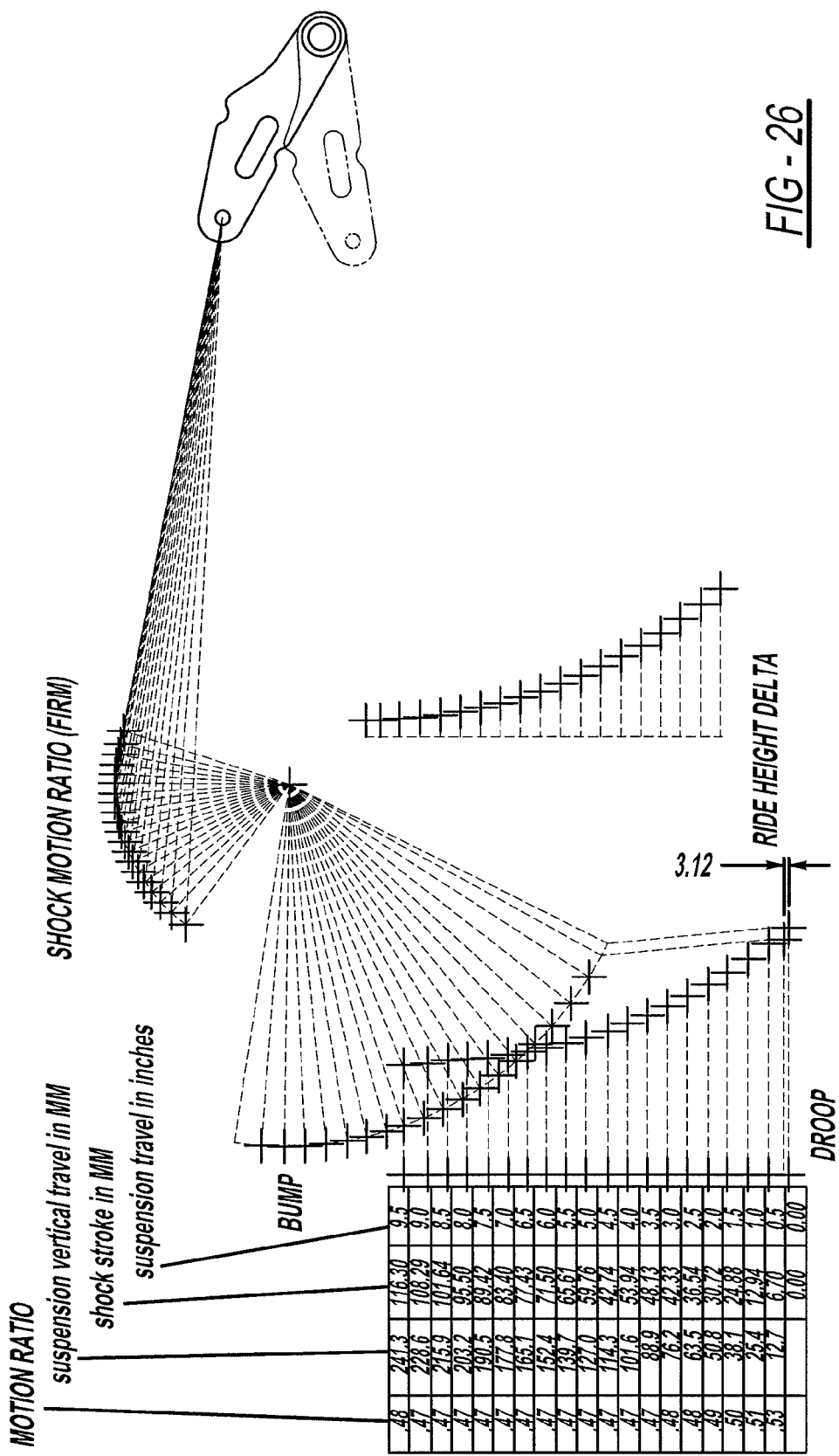
FIG. 26 is a schematic view of the LFD Motion Ratio Layout (firm position).

Using a linkage design with bell cranks or upper arms 18, it was determined that a rising rate can be achieved with the right combination of bell crank lengths, angles and linkage arrangements as schematically depicted in FIGS. 25 and 26. FIG. 25 shows the different values including motion ratio, shock stroke and suspension travel achieved when the arm 100 is positioned to what is referred to as a soft suspension setting of the LFD, while FIG. 26 shows the different values in what is referred to as a hard suspension setting. Movement of the arm 100 to the soft position changes the angle of the LFD, which in turn affects the motion of the rear arm 16. The change in motion of the motion of the rear arm 16 is schematically shown in FIGS. 25 and 26 as rear arm or bell crank movement plots 90. When the suspension encounters a bump the lower link 20 of the rear arm 16 will droop in different ways depending on how it is connected to the upper arm 18 and the setting of the LFD. The movement of the lower link 20 is schematically shown in FIGS. 25 and 26 as lower link plots 20. The position of the arm 100 in the soft range will produce different results shown in the tables of FIGS. 25 and 26, which have values for motion ratio, shock stroke and suspension travel.

Figure 22:
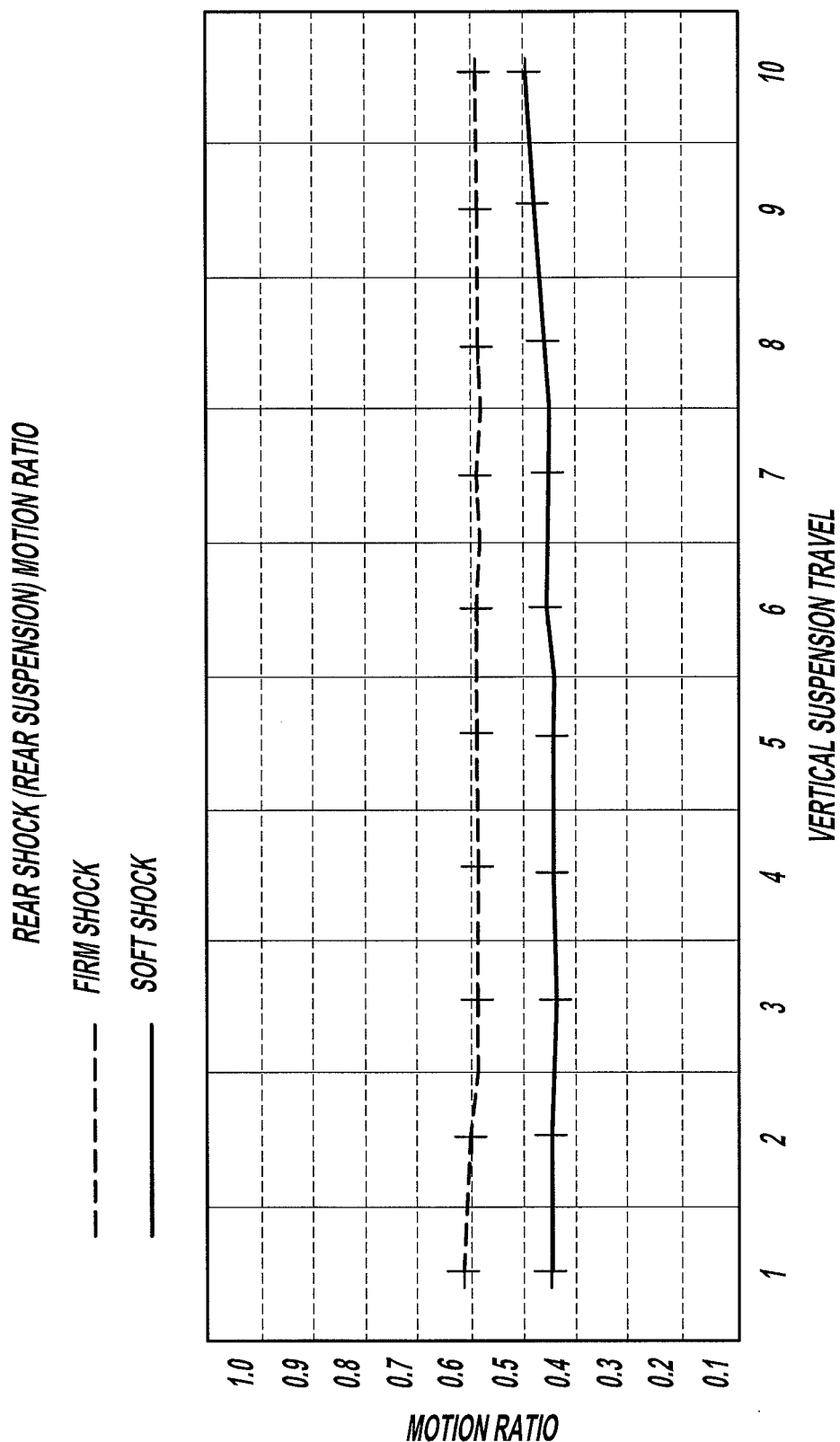
FIG. 22 is a Motion Ratio Graph.

FIG. 22 graphically shows in more detail the affect the soft shock and firm shock setting have on vertical suspension travel versus motion ratio. The firm shock settings have a higher motion ratio than the soft shock setting. This means that the suspension components will move less relative to each other as vertical suspension travel. In other words the firm shock setting will keep the suspension tight and would be a rougher ride on bumpy terrain. However, embodiments of the present invention allow for adjustments to be made while the snowmobile is being driven, therefore the suspension can be adjusted to a soft setting when the terrain chances.

Figure 23:
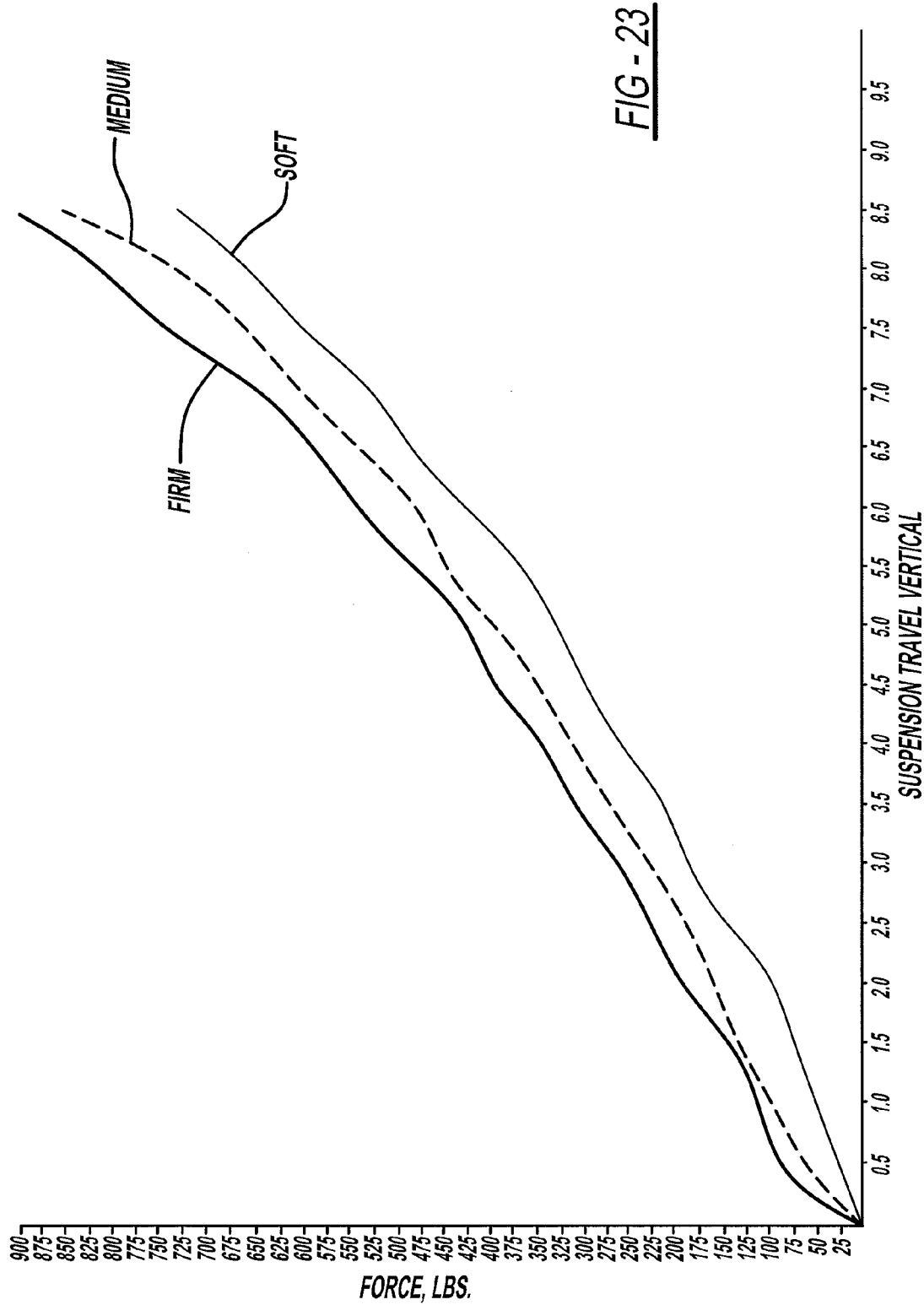
FIG. 23 is a Force/Displacement Graphs.

FIG. 23 is a graphical representation of the vertical suspension travel versus the amount of force applied to the suspension. The graph show the affect of a firm, medium and soft setting the suspension.

Figure 21:
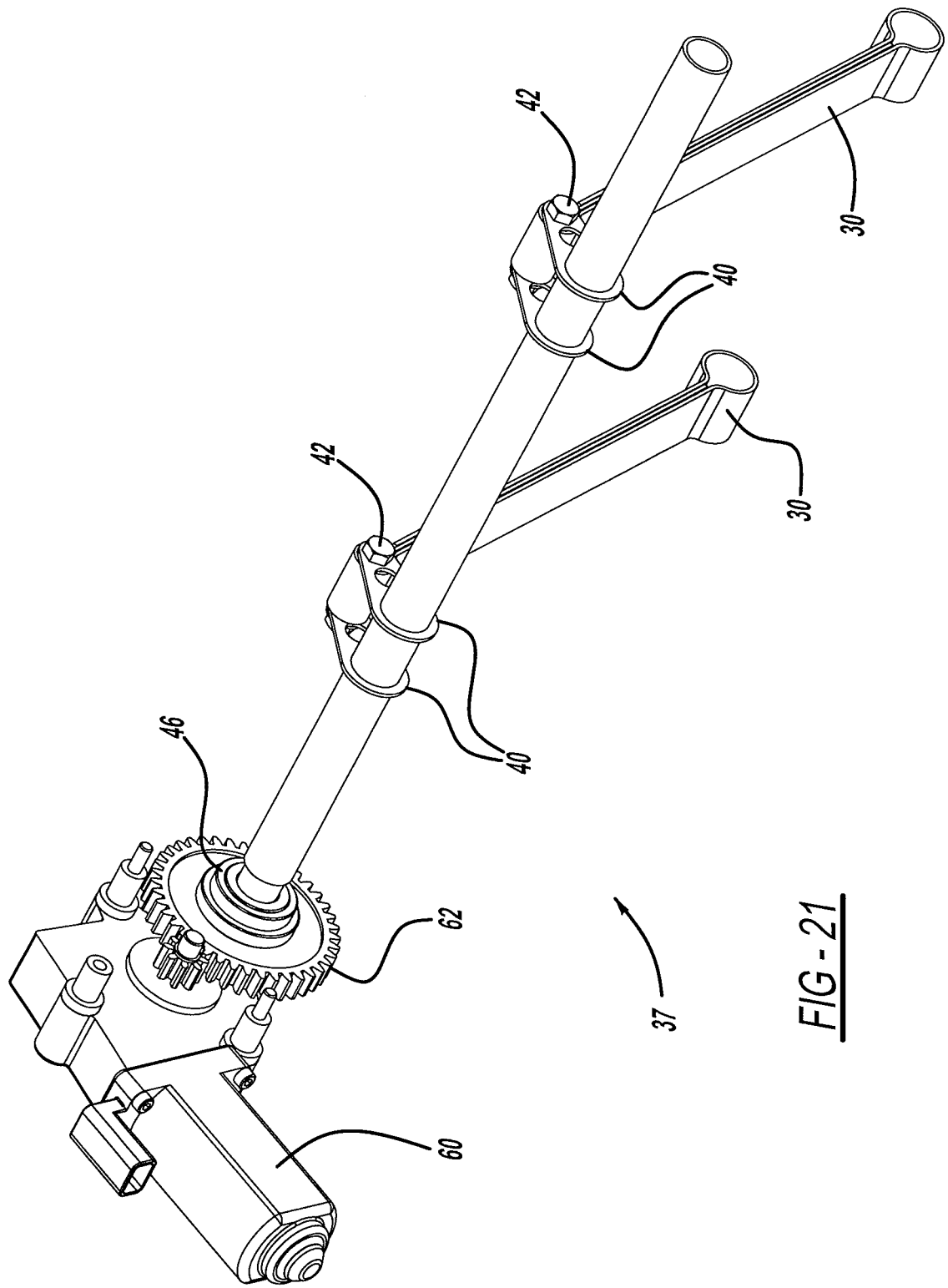
FIG. 21 is a partial isometric view of electrically controlled limiter mechanism.

The desired results were achieved with a bell crank 18, link 20, and varying the axis angle of the spring element or LFD 26, 26'. In the present embodiment of the invention, LFD 26, 26' has a chassis end pivot 96 at one end and a bell crank end pivot 98 at the opposite end of the LFD 26, 26'. By moving the chassis end pivot 96 of the LFD at the chassis end, one is able to change the angle and force vector of the LFD 26, 26'. This alone produces a change in force displacement characteristics as shown in FIGS. 21 and 22. A further change in the rising rate feature may be a different type of spring rate constant typically featured in compound wound steel coil springs, or a combination of different springs mounted end to end along the LFD axis. In addition, there are commercially available air springs which offer even more progressive spring constants as compared to steel wire spring types. Any combination of changing the LFD axis angle with respect to the bell crank 18 and by adding varying types of spring rate constants achieves a varying and tunable rising rate configuration.

Figure 15:
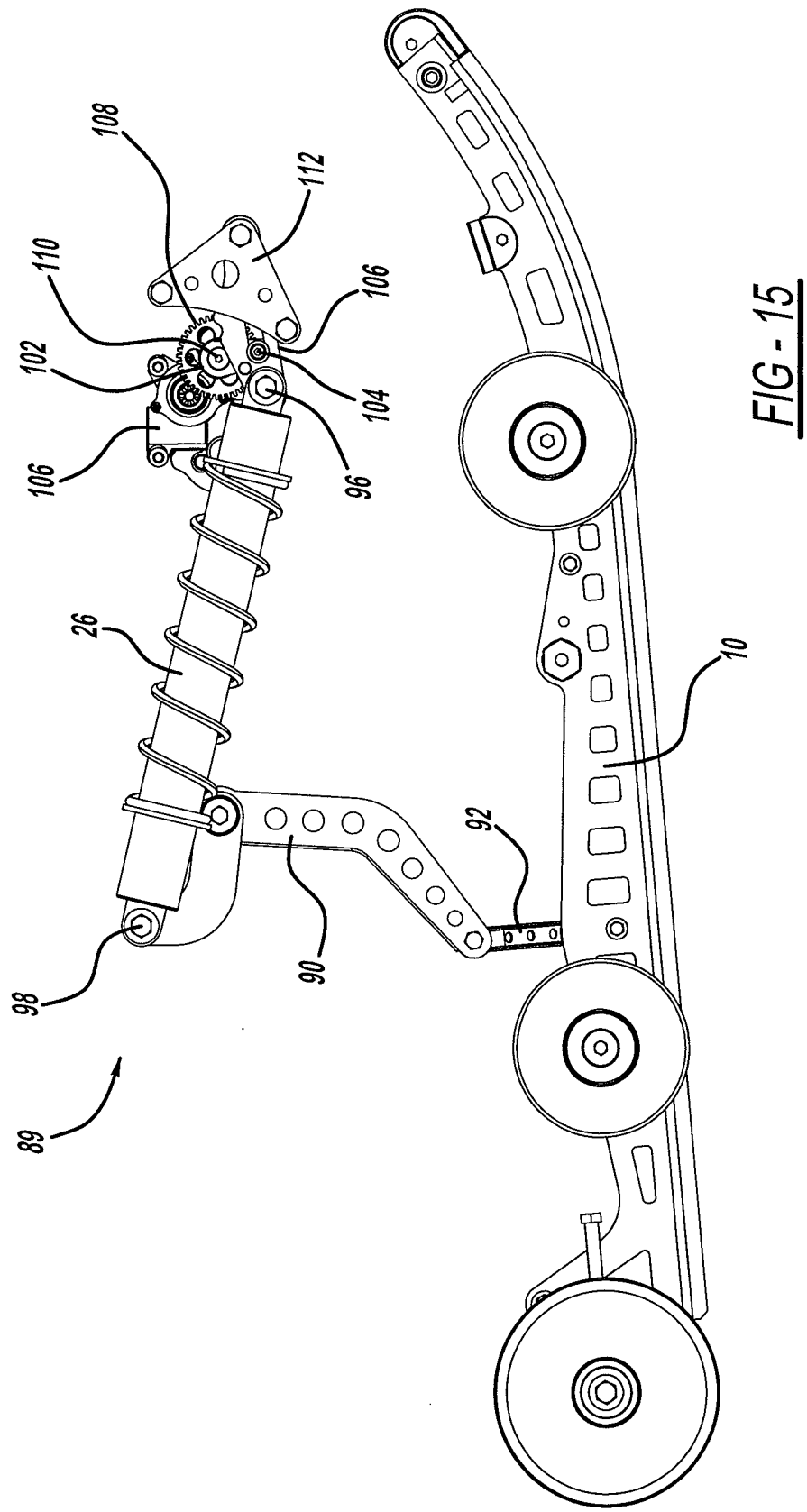
FIG. 15 is a partial side view of electrically controlled shock angle adjustment and related linkages.
Figure 16:
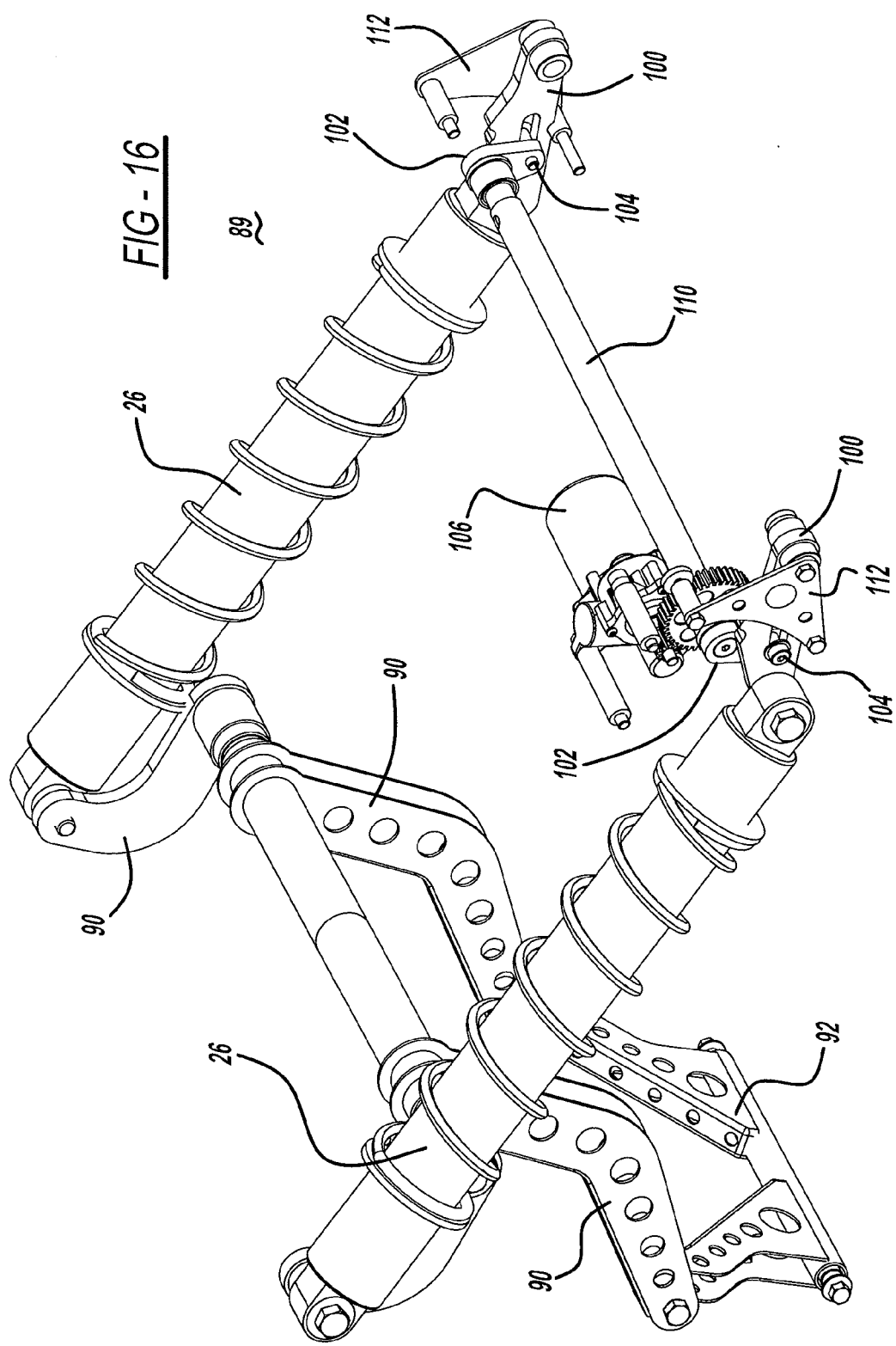
FIG. 16 is a partial isometric view of electrically controlled shock angle mechanism.
Figure 17:
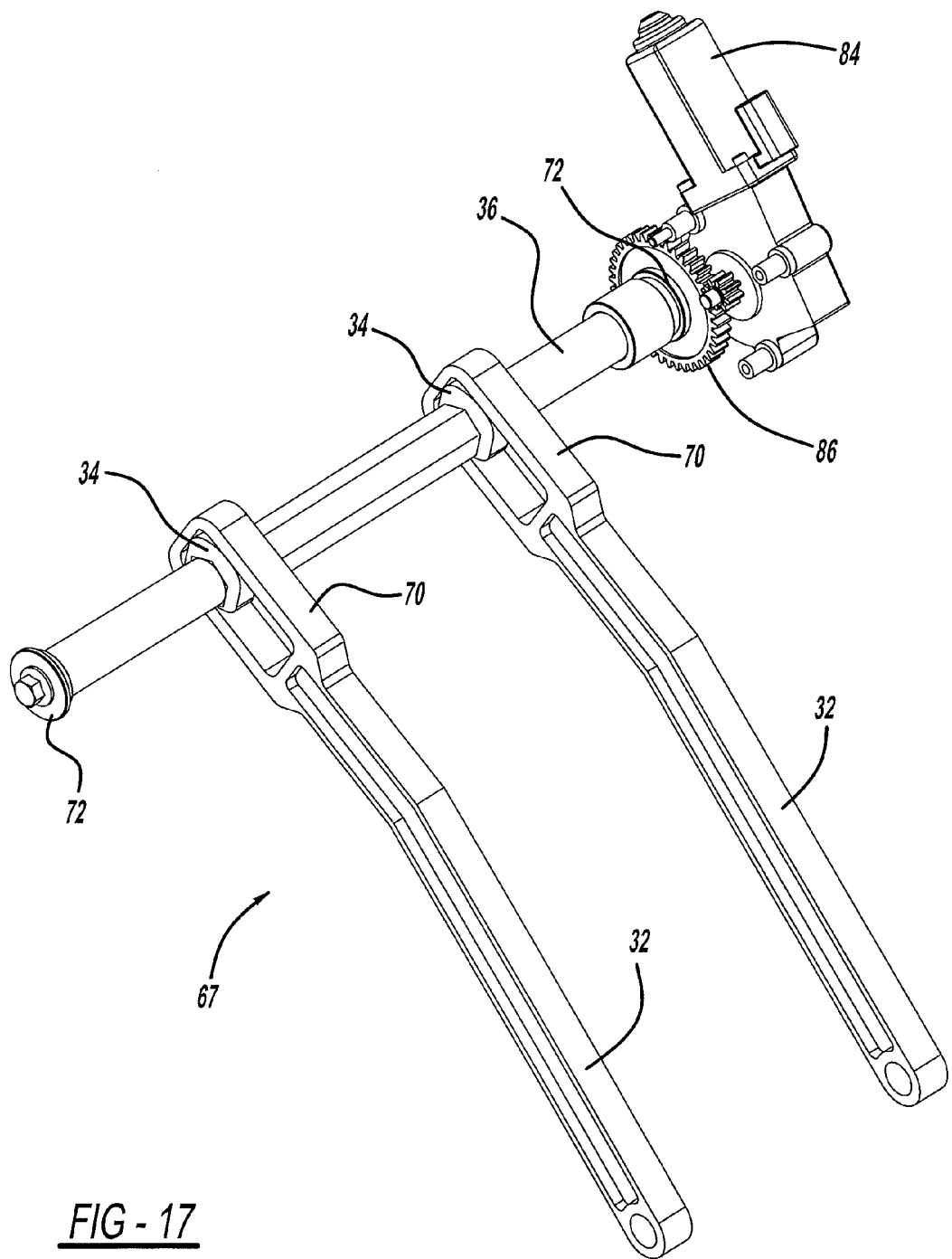
FIG. 17 is a partial isometric view of electrically controlled coupling adjustment mechanism.
Figure 18:
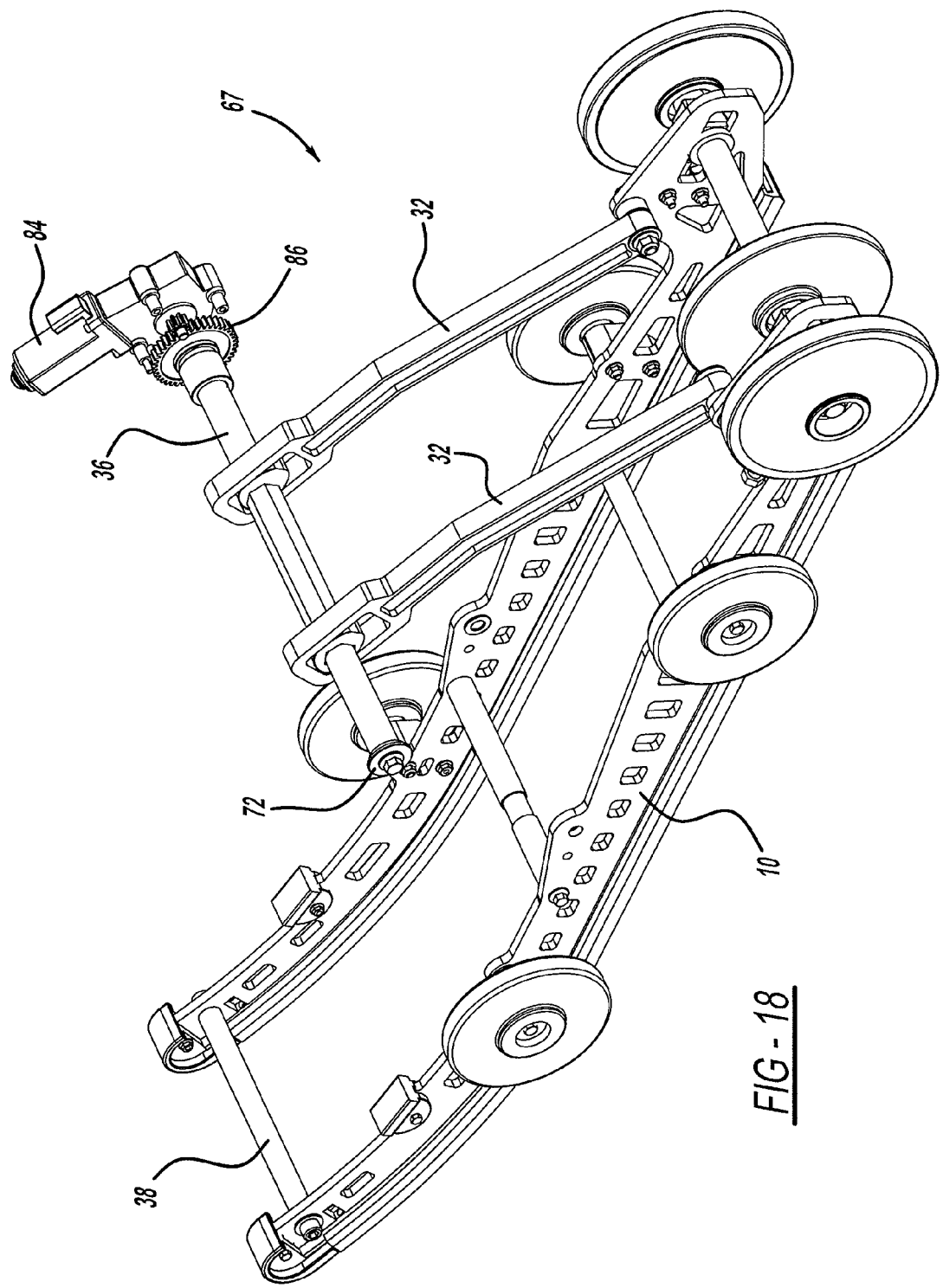
FIG. 18 is a left rear isometric partial view of skid frame assembly and electrically controlled coupling adjustment mechanism.
Figure 19:
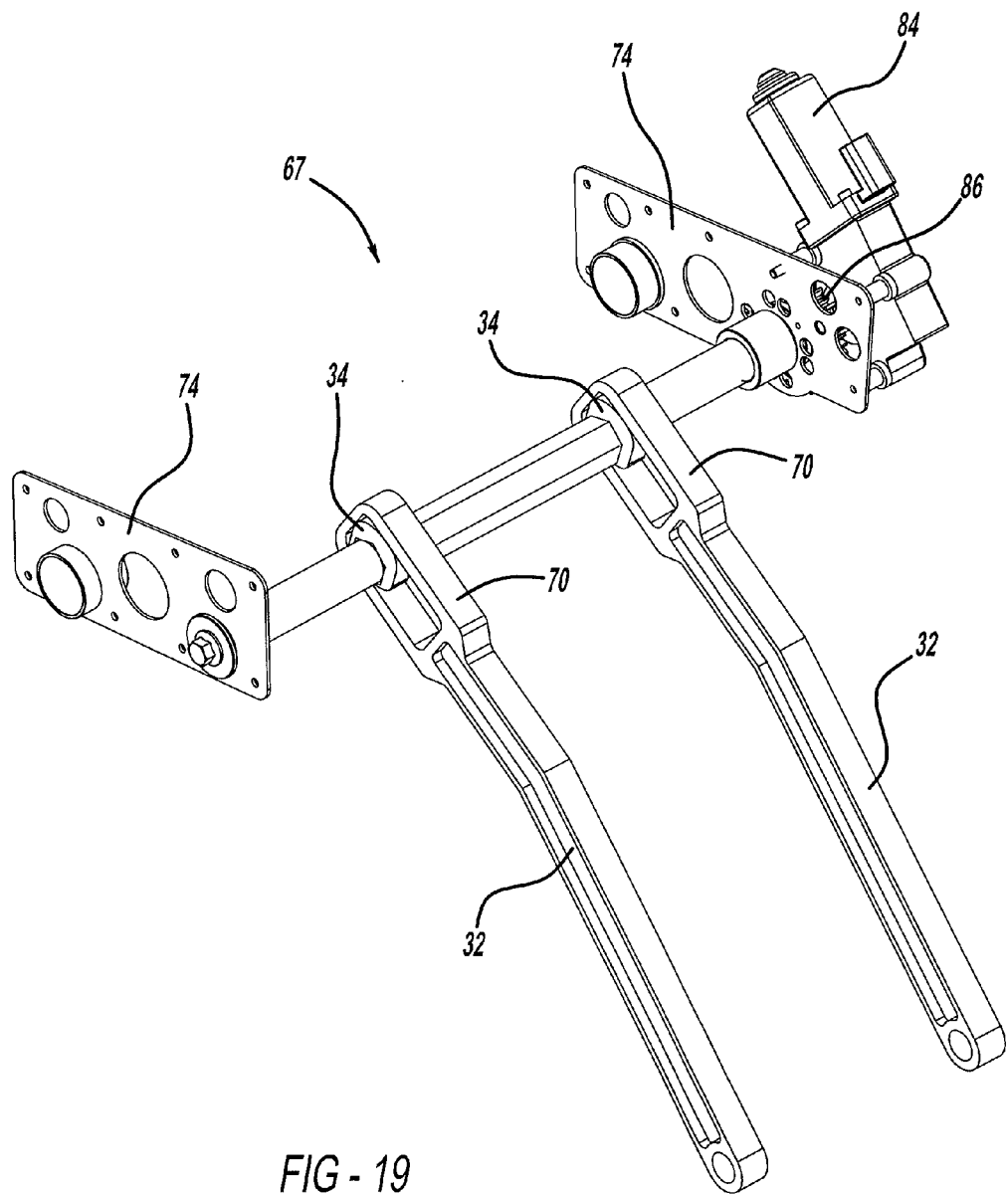
FIG. 19 is a left rear partial isometric view of electrically controlled coupling adjustment mechanism.
Figure 20:
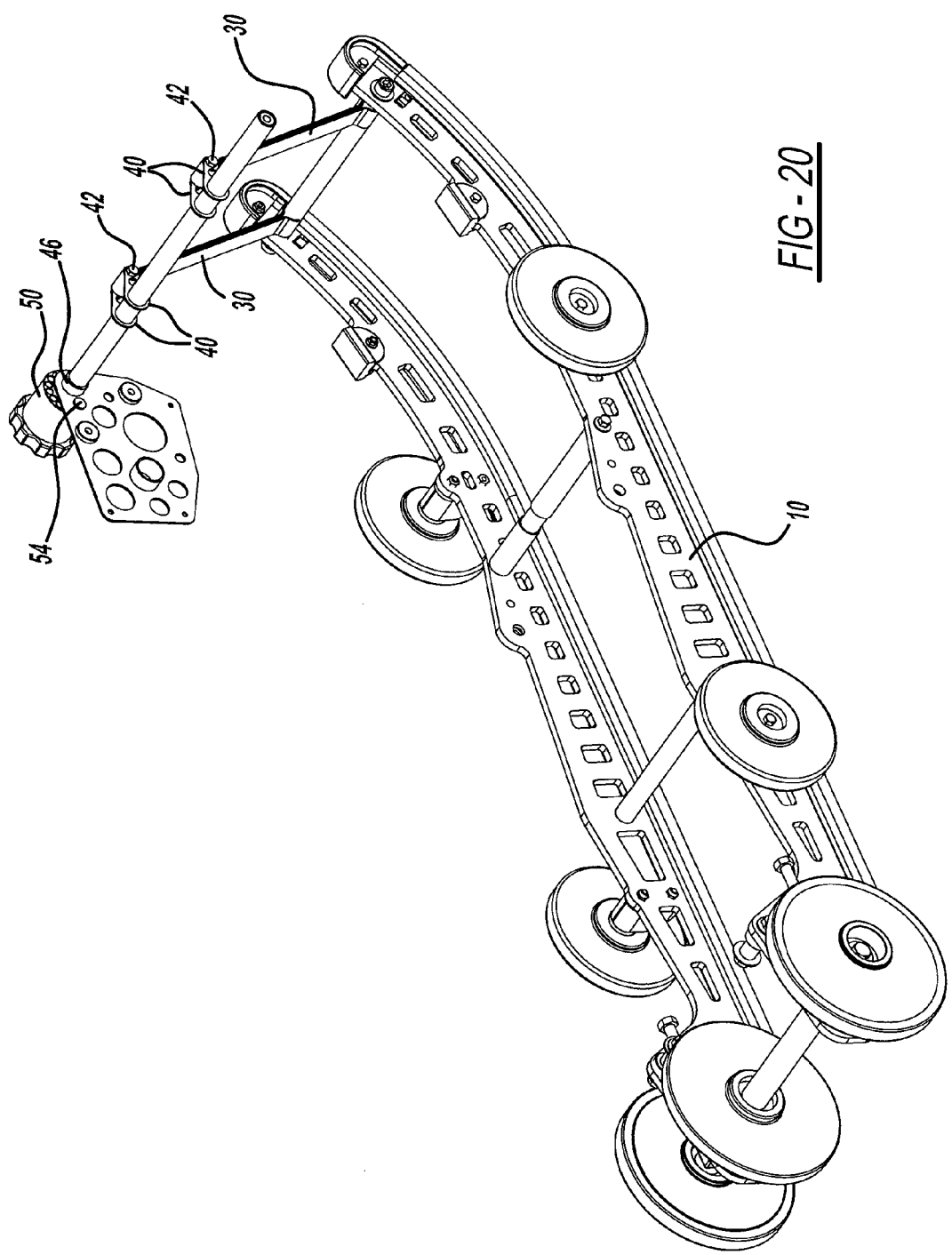
FIG. 20 is a light rear partial isometric view of skid frame assembly with manually adjustable front limiter strap adjustment mechanism.

In one aspect of the present invention shown in FIGS. 15 and 16, the LFD angle is changed by a motor driven mechanism having arms 100, cams 102, pins 104, motor 106, gear 108 and rear arm shaft 110 with pivots 112. The motor 106 drives gear 108 which is rotatably secured to shaft 110 which has cams 102 and cam pins 104 secured to shaft 110. A rotation of cams 102 and cam pins 104 causes the pins 104 to move along slots 114 in arms 100, which cause the arms 100 to move from a lower position to an angled higher position in order to move the chassis end pivot 96 of the LFD 26, 26'. The motor 106 has hall affect sensors internally which output pulse signals to ECM 64 in order to display a spring rate position to display 66.

In a second configuration of the present invention shown in FIGS. 6-9, an air spring type of LFD 26' can be utilized when attached to bell crank 90 and mounts 116 secured to chassis 12 by way of chassis mounts 48. Mounts 116 have three different mounting locations, and a further aspect of the invention could have an arrangement of air type LFD's 26' connected to the motor driven system for varying the angle of the LFD's. The air type LFD's can be adjusted also by means of an onboard electric air compressor (not shown in figures) which could vary the amount of internal pressure inside the LFD. This combination would produce the most overall tuneability for the spring system of the rear suspension.

One can see that packaging any of the aforementioned devices outside of the track zone to a chassis mounted zone, that they now become sprung mass as compared to less favorable unsprung mass. This accomplishes one of the primary objectives of the invention. In one embodiment of the present invention, the snowmobile has about forty percent of the overall weight of the snowmobile suspension assembly is unsprung weight.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A snowmobile suspension system comprising:
   a chassis of a snowmobile;
   a skid frame positioned below said chassis;
   at least one limiter strap connected between said chassis and said skid frame;
   at least one coupling arm connected between said chassis and said skid frame;
   at least one front arm connected between said chassis and said skid frame;
   at least one rear arm connected between said chassis and said skid frame and a linear force device connected to said at least one rear arm;
   a limiter strap adjustment mechanism connected between said chassis and said at least one limiter strap, wherein said limiter strap adjustment mechanism selectively adjusts the length of said at least one limiter strap;
   a coupling arm adjustment mechanism connected between said chassis and said at least one coupling arm, wherein said coupling arm adjustment mechanism selectively adjusts the length of said at least one coupling arm;
   a linear force device adjustment mechanism connected between said chassis and said linear force device, wherein said linear force device adjustment mechanism selectively adjusts the length and angle of said linear force device relative to said at least one rear arm for controlling force displacement characteristics of said at least one rear arm;
   an electronic control module connected to said chassis, said electronic control module configured to electronically control said selective adjustment of one or more of said limiter strap adjustment mechanism, said coupling arm adjustment mechanism and said linear force adjustment mechanism; and
   a display connected to said chassis for displaying information concerning said selective adjustment to a driver of said snowmobile and receiving driver commands concerning driver selections for further adjustment settings.

2. The snowmobile suspension system of claim 1 wherein said snowmobile suspension system has an unsprung weight amount equal to about forty percent of said overall weight of said snowmobile suspension assembly.

3. The snowmobile suspension system of claim 1 wherein said limiter strap adjustment mechanism, said coupling arm adjustment mechanism and said linear force adjustment mechanism each individually have electronic motors for controlling said selective adjustment.

4. The snowmobile suspension system of claim 1 wherein said limiter strap adjustment mechanism, said coupling arm adjustment mechanism and said linear force adjustment mechanism each individually have a manual adjustment device for controlling said selective adjustment.

5. The snowmobile suspension system of claim 1 wherein said limiter strap adjustment mechanism, said coupling arm adjustment mechanism and said linear force adjustment mechanism have either a manual adjustment mechanism or an electronic motor for controlling said selective adjustment.

6. The snowmobile suspension system of claim 1 wherein said limiter strap adjustment mechanism further comprises:
 a cross member connected at one end of said at least one limiter strap, said cross member extends across and is pivotally connected between two skids of said skid frame;
 a rotatable shaft connected at a second end of said at least one limiter strap, said rotatable shaft is rotatably connected to said chassis; and
 a motor operably engaged to one end of said rotatable shaft for rotating said rotatable shaft about a longitudinal axis of said rotatable shaft and adjusting the length of said at least one limiter strap.

7. The snowmobile suspension system of claim 1 wherein said coupling arm adjustment mechanism further comprises:
 one end of said at least one coupling arm is pivotally connected to said skid frame;
 a coupling shaft rotatably connected to said chassis;
 a second end of said at least one coupling arm having an enclosed eye portion connected to a coupling cam on said coupling shaft, wherein said enclosed eye portion and said coupling cam control the operative length of said at least one coupling arm; and
 a motor operably engaged to one end of said coupling shaft for rotating said coupling shaft about a longitudinal axis of said coupling shaft and adjusting the length of said at least one coupling arm.

8. The snowmobile suspension system of claim 1 wherein said coupling arm adjustment mechanism further comprises:
 one end of said at least one coupling arm is pivotally connected to said skid frame;
 a second end of said at least one coupling arm having an enclosed eye portion connected to a coupling cam on said coupling shaft, wherein said enclosed eye portion and said coupling cam control the operative length of said at least one coupling arm and said coupling shaft is rotatably connected to said chassis; and
 a motor operably engaged to one end of said coupling shaft for rotating said coupling shaft about a longitudinal axis of said coupling shaft and adjusting the length of said at least one coupling arm.

9. The snowmobile suspension system of claim 1 wherein said linear force device adjustment mechanism further comprises:
 one end of said at least one rear arm pivotally connected to said skid frame;
 a second end of said at least one rear arm connected to a bell crank that is pivotally connected to a bell crank end of said linear force device; and
 a chassis end pivot of said linear force device pivotally connected to an arm having a slot for receiving a pin driven by a motor for causing said arm to pivot and move said pin in said slot, wherein said movement of said arm causes said linear force device to pivot about said bell crank end change the length and angle of said linear force device.

10. A snowmobile suspension system comprising:
 a chassis of a snowmobile;
 a skid frame positioned below said;
 at least one limiter strap connected between said chassis and said skid frame;
 a limiter strap adjustment mechanism connected between said chassis and said at least one limiter strap, wherein said limiter strap adjustment mechanism selectively adjusts the length of said at least one limiter strap;
 an electronic control module connected to said chassis, said electronic control module configured to electronically control said selective adjustment of said limiter strap adjustment mechanism; and
 a display connected to said chassis and said electronic control module for displaying information concerning said selective adjustment to a driver of said snowmobile and serving as an interface to said electronic control module for receiving driver commands concerning driver selections for new adjustment settings.

11. The snowmobile suspension system of claim 10 wherein said snowmobile suspension system has an unsprung weight amount equal to about 40% of the total mass of said snowmobile suspension.

12. The snowmobile suspension system of claim 10 wherein said limiter strap adjustment mechanism has an electronic motor for controlling said selective adjustment.

13. The snowmobile suspension system of claim 10 wherein said limiter strap adjustment mechanism has a manual adjustment device for controlling said selective adjustment.

14. The snowmobile suspension system of claim 10 wherein said limiter strap adjustment mechanism further comprises:
 a cross member connected at one end to said at least one limiter strap, said cross member is connected to said skid frame; and
 a rotatable shaft connected at a second end of said at least one limiter strap, said rotatable shaft is rotatably connected to said chassis, wherein said rotatable shaft is rotatable about a longitudinal axis of said rotatable shaft for adjusting the length of said at least one limiter strap.

15. The snowmobile suspension system of claim 14 further comprising at least one plate connected to said rotatable shaft for pivotably connecting to said second end of said at least one limiter strap, wherein rotation of said rotatable shaft causes said at least one plate and said connection between said plate and said at least one limiter strap to rotate causing variation in the length of said limiter strap.

16. The snowmobile suspension system of claim 14 wherein said rotation of said rotatable shaft is accomplished using a motor operably engaged to one end of said rotatable shaft for rotating said rotatable shaft about a longitudinal axis of said rotatable shaft and adjusting the length of said at least one limiter strap.

17. The snowmobile suspension system of claim 14 wherein said rotation of said rotatable shaft is accomplished using a manual adjustment mechanism wherein the rotatable shaft is manually rotated by the driver of the snowmobile.

18. The snowmobile suspension system of claim 10 further comprising;
    at least one coupling arm connected between said chassis and said skid frame;
    a coupling arm adjustment mechanism connected between said chassis and said at least one coupling arm, wherein said coupling arm adjustment mechanism selectively adjusts the length of said at least one coupling arm.

19. The snowmobile suspension system of claim 18 further comprising:
    one end of said at least one coupling arm being pivotably connected to said skid frame;
    a coupling shaft rotatably connected to said chassis;
    a second end of said at least one coupling end having an enclosed eye portion connected to a coupling cam on said coupling shaft, wherein said enclosed eye portion and said coupling cam control the operative length of said at least one coupling arm by rotation of said coupling shaft.

20. The snowmobile suspension system of claim 19 wherein said coupling arm adjustment mechanism further comprises a motor operably engaged to one end of said coupling shaft for rotating said coupling about a longitudinal axis of said coupling shaft and adjusting the length of said at least one coupling arm.

21. The snowmobile suspension system of claim 19 wherein said coupling arm adjustment mechanism further comprises a manual adjustment device engaged to one end of said coupling shaft for rotating said coupling shaft about a longitudinal axis of said coupling shaft and adjusting the length of said at least one coupling arm.

22. The snowmobile suspension system of claim 10 further comprising:
    at least one rear arm connected between said chassis and said skid frame and a linear force device connected to said at least one rear arm;
    a linear force device adjustment mechanism connected between said chassis and said linear force device, wherein said linear force device adjustment mechanism selectively adjusts the length and angle of said linear force device relative to said at least one rear arm for controlling force displacement characteristics of said at least one rear arm.

23. The snowmobile suspension system of claim 22 wherein said linear force device adjustment mechanism further comprises:
    one end of said at least one rear arm pivotably connected to said skid frame;
    a second end of said at least one rear arm connected to a bell crank that is pivotably connected to a bell crank end of said linear force device; and
    a chassis end pivot of said linear force device pivotably connected to an arm having a slot for receiving a pin that is selectively driven to cause said arm to pivot and move said pin in said slot, wherein said movement of said arm causes said linear force device to pivot about said bell crank end to change the length and angle of said linear force device.

24. The snowmobile suspension system of claim 23 further comprising motor connected to said pin for electronically controlling the movement of said pin in said slot.

25. The snowmobile suspension system of claim 23 further comprising a manual adjustment device connected to said pin for electronically controlling the movement of said pin in said slot.

26. A snowmobile suspension system comprising:
    a chassis of a snowmobile;
    a skid frame positioned below said chassis;
    at least one coupling arm connected between said chassis and said skid frame;
    a coupling arm adjustment mechanism connected between said chassis and said at least one coupling arm, wherein said coupling arm adjustment mechanism selectively adjusts the length of said at least one coupling arm;
    an electronic control module connected to said chassis, said electronic control module configured to electronically control said selective adjustment of said coupling arm adjustment mechanism; and
    a display connected to said chassis and said electronic control module for displaying information concerning said selective adjustment to a driver of said snowmobile and serving as an interface to said electronic control module for receiving driver commands concerning driver selections for new adjustment settings.

27. The snowmobile suspension system of claim 26 wherein said snowmobile suspension system has an unsprung weight amount equal to about 40% of the total mass of said snowmobile suspension.

28. The snowmobile suspension system of claim 26 wherein said coupling arm adjustment mechanism has an electronic motor for controlling said selective adjustment.

29. The snowmobile suspension system of claim 26 wherein said coupling arm adjustment mechanism has a manual adjustment device for controlling said selective adjustment.

30. The snowmobile suspension system of claim 26 further comprising:
    one end of said at least one coupling arm is pivotably connected to said skid frame;
    a coupling shaft rotatably connected to said chassis;
    a second end of said at least one coupling end having an enclosed eye portion connected to a coupling cam on said coupling shaft, wherein said enclosed eye portion and said coupling cam control the operative length of said at least one coupling arm by rotation of said coupling shaft.

31. The snowmobile suspension system of claim 30 wherein said coupling arm adjustment mechanism further comprises a motor operably engaged to one end of said coupling shaft for rotating said coupling about a longitudinal axis of said coupling shaft and adjusting the length of said at least one coupling arm.

32. The snowmobile suspension system of claim 30 wherein said coupling arm adjustment mechanism further comprises a manual adjustment device engaged to one end of said coupling shaft for rotating said coupling shaft about a longitudinal axis of said coupling shaft and adjusting the length of said at least one coupling arm.

33. The snowmobile suspension system of claim 26 further comprising:
    at least one rear arm connected between said chassis and said skid frame and a linear force device connected to said at least one rear arm;
    a linear force device adjustment mechanism connected between said chassis and said linear force device, wherein said linear force device adjustment mechanism selectively adjusts the length and angle of said linear force device relative to said at least one rear arm for controlling force displacement characteristics of said at least one rear arm.

34. The snowmobile suspension system of claim 33 wherein said linear force device adjustment mechanism further comprises:
one end of said at least one rear arm pivotably connected to said skid frame;
a second end of said at least one rear arm connected to a bell crank that is pivotably connected to a bell crank end of said linear force device; and
a chassis end pivot of said linear force device pivotably connected to an arm having a slot for receiving a pin that is selectively driven to cause said arm to pivot and move said pin in said slot, wherein said movement of said arm causes said linear force device to pivot about said bell crank end to change the length and angle of said linear force device.

35. The snowmobile suspension system of claim 34 further comprising motor connected to said pin for electronically controlling the movement of said pin in said slot.

36. The snowmobile suspension system of claim 34 further comprising a manual adjustment device connected to said pin for electronically controlling the movement of said pin in said slot.

37. The snowmobile suspension system of claim 26 further comprising:
at least one limiter strap has a cross member connected at one end to said at least one limiter strap, said cross member is connected to said skid frame; and
a rotatable shaft connected at a second end of said at least one limiter strap, said rotatable shaft is rotatably connected to said chassis, wherein said rotatable shaft is rotatable about a longitudinal axis of said rotatable shaft for adjusting the length of said limiter strap.

38. The snowmobile suspension system of claim 37 further comprising at least one plate connected to said rotatable shaft for pivotably connecting to said second end of said at least one limiter strap, wherein rotation of said rotatable shaft causes said at least one plate and said connection between said plate and said at least one limiter strap to rotate causing variation in the length of said limiter strap.

39. The snowmobile suspension system of claim 37 wherein said rotation of said rotatable shaft is accomplished using a motor operably engaged to one end of said rotatable shaft for rotating said rotatable shaft about a longitudinal axis of said rotatable shaft and adjusting the length of said at least one limiter strap.

40. The snowmobile suspension system of claim 37 wherein said rotation of said rotatable shaft is accomplished using a manual adjustment mechanism wherein the rotatable shaft is manually rotated by the driver of the snowmobile.

41. A snowmobile suspension system comprising:
a chassis of a snowmobile;
a skid frame positioned below said chassis;
at least one rear arm connected between said chassis and said skid frame and a linear force device connected to said at least one rear arm; and
a linear force device adjustment mechanism connected between said chassis and said linear force device, wherein said linear force device adjustment mechanism selectively adjusts the length and angle of said linear force device relative to said at least one rear arm for controlling force displacement characteristics of said at least one rear arm;
an electronic control module connected to said chassis, said electronic control module configured to electronically control said selective adjustment of said linear force device; and
a display connected to said chassis and said electronic control module for displaying information concerning said selective adjustment to a driver of said snowmobile and serving as an interface to said electronic control module for receiving driver commands concerning driver selections for new adjustment settings.

42. The snowmobile suspension system of claim 41 further comprising:
at least one coupling arm connected between said chassis and said skid frame;
a coupling arm adjustment mechanism connected between said chassis and said at least one coupling arm, wherein said coupling arm adjustment mechanism selectively adjusts the length of said at least one coupling arm.

43. The snowmobile suspension system of claim 41 wherein said snowmobile suspension system has an unsprung weight amount equal to about 40% of the total mass of said snowmobile suspension.

44. The snowmobile suspension system of claim 41 wherein said linear force device adjustment mechanism has an electronic motor for controlling said selective adjustment.

45. The snowmobile suspension system of claim 41 wherein said linear force device adjustment mechanism has a manual adjustment device for controlling said selective adjustment.

46. The snowmobile suspension system of claim 42 further comprising:
said at least one coupling arm having one end pivotably connected to said skid frame;
a coupling shaft rotatably connected to said chassis;
a second end of said at least one coupling end having an enclosed eye portion connected to a coupling cam on said coupling shaft, wherein said enclosed eye portion and said coupling cam control the operative length of said at least one coupling arm by rotation of said coupling shaft.

47. The snowmobile suspension system of claim 42 wherein said coupling arm adjustment mechanism further comprises a motor operably engaged to one end of said coupling shaft for rotating said coupling about a longitudinal axis of said coupling shaft and adjusting the length of said at least one coupling arm.

48. The snowmobile suspension system of claim 42 wherein said coupling arm adjustment mechanism further comprises a manual adjustment device engaged to one end of said coupling shaft for rotating said coupling shaft about a longitudinal axis of said coupling shaft and adjusting the length of said at least one coupling arm.

49. The snowmobile suspension system of claim 41 wherein said linear force device adjustment mechanism further comprises:
one end of said at least one rear arm pivotably connected to said skid frame;
a second end of said at least one rear arm connected to a bell crank that is pivotably connected to a bell crank end of said linear force device; and
a chassis end pivot of said linear force device pivotably connected to an arm having a slot for receiving a pin that is selectively driven to cause said arm to pivot and move said pin in said slot, wherein said movement of said arm causes said linear force device to pivot about said bell crank end to change the length and angle of said linear force device.

50. The snowmobile suspension system of claim 49 further comprising motor connected to said pin for electronically controlling the movement of said pin in said slot.

51. The snowmobile suspension system of claim 49 further comprising a manual adjustment device connected to said pin for electronically controlling the movement of said pin in said slot.

52. The snowmobile suspension system of claim 41 further comprising:
- at least one limiter strap has a cross member connected at one end to said at least one limiter strap, said cross member is connected to said skid frame; and
- a rotatable shaft connected at a second end of said at least one limiter strap, said rotatable shaft is rotatably connected to said chassis, wherein said rotatable shaft is rotatable about a longitudinal axis of said rotatable shaft for adjusting the length of said limiter strap.

53. The snowmobile suspension system of claim 52 further comprising at least one plate connected to said rotatable shaft for pivotably connecting to said second end of said at least one limiter strap, wherein rotation of said rotatable shaft causes said at least one plate and said connection between said plate and said at least one limiter strap to rotate causing variation in the length of said limiter strap.

54. The snowmobile suspension system of claim 52 wherein said rotation of said rotatable shaft is accomplished using a motor operably engaged to one end of said rotatable shaft for rotating said rotatable shaft about a longitudinal axis of said rotatable shaft and adjusting the length of said at least one limiter strap.

55. The snowmobile suspension system of claim 52 wherein said rotation of said rotatable shaft is accomplished using a manual adjustment mechanism wherein the rotatable shaft is manually rotated by the driver of the snowmobile.

* * * * *